(12) United States Patent
Lee

(10) Patent No.: US 12,294,330 B2
(45) Date of Patent: May 6, 2025

(54) HYBRID POWER GENERATION SYSTEM

(71) Applicant: Yoon Won Lee, Seoul (KR)

(72) Inventor: Yoon Won Lee, Seoul (KR)

( * ) Notice: Subject to any disclaimer, the term of this patent is extended or adjusted under 35 U.S.C. 154(b) by 482 days.

(21) Appl. No.: 17/628,967

(22) PCT Filed: Jun. 17, 2020

(86) PCT No.: PCT/KR2020/007799
§ 371 (c)(1),
(2) Date: Jan. 21, 2022

(87) PCT Pub. No.: WO2021/020728
PCT Pub. Date: Feb. 4, 2021

(65) Prior Publication Data
US 2022/0263453 A1   Aug. 18, 2022

(30) Foreign Application Priority Data
Aug. 1, 2019 (KR) .................. 10-2019-0093949

(51) Int. Cl.
*H02S 10/12* (2014.01)
*F03D 9/00* (2016.01)
(Continued)

(52) U.S. Cl.
CPC .............. *H02S 10/12* (2014.12); *F03D 9/007* (2013.01); *F03D 9/11* (2016.05); *H02S 10/20* (2014.12); *H02S 50/00* (2013.01)

(58) Field of Classification Search
CPC .......... F03D 3/0409; F03D 7/06; F03D 9/009; H02S 10/12
See application file for complete search history.

(56) References Cited

U.S. PATENT DOCUMENTS

| 2006/0125241 A1* | 6/2006 | DuHamel ................. F03D 9/25 290/44 |
| 2016/0290319 A1* | 10/2016 | Mamdouh ............... F03D 13/20 |
| 2019/0251208 A1* | 8/2019 | Tamasato ................ H02S 99/00 |

FOREIGN PATENT DOCUMENTS

| CN | 107070371 A | * | 8/2017 |
| KR | 10-2004-0016913 A | | 2/2004 |

(Continued)

OTHER PUBLICATIONS

English Machine Translation of CN 107070371A (Year: 2017).*
English Machine Translation of KR 10-1577901 (Year: 2015).*

*Primary Examiner* — Kourtney R S Carlson
(74) *Attorney, Agent, or Firm* — KORUS Patent, LLC; Seong Il Jeong

(57) ABSTRACT

A hybrid power generation system according to an embodiment of the present invention includes: a blade provided on a vertical shaft to reduce noise and vibration during rotation; a wind collecting duct increasing speed of wind and rotating the blade at a high speed to improve efficiency of wind energy; a wind collecting room provided in the blade to increase a rotational force and efficiency of wind energy; a photovoltaic module concentration device driving a wind inducing rotation motor provided in the wind collecting duct to rotate a wind inducing rotation blade with solar energy to increase wind and forcibly discharge the wind into a blade wind collecting room of a turbine module to increase an amount of power generation even when wind does not blow, and technologies based on Internet of Things (IoT) and Artificial Intelligence (AI), such as a camera, a fire detection sensor, a drone, and the like that can reduce a risk of breakdown of the system and operate efficiently.

3 Claims, 29 Drawing Sheets

(51) Int. Cl.
    *F03D 9/11*     (2016.01)
    *H02S 10/20*     (2014.01)
    *H02S 50/00*     (2014.01)

(56) References Cited

FOREIGN PATENT DOCUMENTS

| | | |
|---|---|---|
| KR | 10-2010-0035289 A | 4/2010 |
| KR | 10-1409774 B1 | 6/2014 |
| KR | 10-1577901 B1 | 12/2015 |
| KR | 10-2018-0007140 A | 1/2018 |
| KR | 10-1916374 B1 | 11/2018 |
| KR | 10-2068280 B1 | 1/2020 |

\* cited by examiner

HYBRID POWER GENERATION SYSTEM

FIELD OF THE INVENTION

The present invention relates to a power generation device, and more particularly, to a hybrid power generation system for generating electric energy through wind energy and solar energy.

BACKGROUND OF THE INVENTION

Electricity is obtained by operating a generator with energy from burning fossil fuels, such as coal or oil, or from nuclear power, solar power, solar heat, wind power and hydro power.

Generators operated by fossil fuels have been widely used due to high efficiency, but there is problems of depleting resources and causing environmental pollution. Accordingly, the use of generators based on nuclear power or other types of power are gradually expanding.

However, nuclear power generation has a problem of causing great damage in case of an accident such as a radiation leak. Thus, it is difficult to select a site to install the generator due to the strong backlash of local residents.

Accordingly, in recent years, various attempts are being made to increase efficiency of generators using wind power, hydro power, and solar power, which are less likely to deplete resources or pollute the environment.

Meanwhile, wind power generation produces electricity by turning a windmill with natural wind to form a rotational force and operating a generator by increasing the speed.

The wind power generation can convert wind energy into electric energy only within about 60% of theoretical wind energy of blades. Furthermore, in consideration of efficiency of a blade shape, a mechanical friction, and efficiency of a generator, substantially only 20% to 45% of the theoretical wind energy is used as electric energy.

On the other hand, as technology of the wind power generation device has gradually improved, the cost of wind power generation has decreased. Accordingly, the wind power generation can compete with fossil fuels in terms of cost of power generation. In addition, since energy produced by the wind power generation device is eco-friendly and does not produce pollution, the wind power generation device is expected to expand rapidly.

However, since the wind power generation device requires an average annual wind speed of 6 m/s or more to ensure power generation efficiency, there are a lot of limitations in the area where the system can be installed. Furthermore, many areas on land have already been occupied by wind power generators. That is, the installation sites for wind power generation are reaching the saturation point.

In addition, the wind power generation device has a critical disadvantage that the power generation efficiency is not guaranteed below a certain wind speed.

Patent Document 1 Korean Patent Publication No. 10-2004-0016913

DETAILED DESCRIPTION OF THE INVENTION

Technical Problems

The object of the present invention is to provide a hybrid power generation system having a blade provided on a vertical shaft to reduce noise and vibration during rotation. Another object of the present invention is to provide a hybrid power generation system that includes a wind collecting duct to increase speed of wind, rotate the blade at a high speed, and improve efficiency of wind energy. Another object of the present invention is to provide a hybrid power generation system having a blade room capable of collecting wind in the blade to rotate the blade at a high speed and increase efficiency of wind energy. Another object of the present invention is to provide a hybrid power generation system that enables only forward wind to introduce into the blade room without being affected by backwind to solve conventional problems that a rotational speed of a blade and an amount of power generation are reduced by backwind. Another object of the present invention is to provide a hybrid power generation system that includes a photovoltaic module concentration device on a top portion of the system, drives a motor provided in the wind collecting duct to operate a wind inducing means using electric energy generated from the photovoltaic module concentration device, and artificially creates high speed wind, even when wind does not blow, to increases an amount of power generation.

SUMMARY OF THE INVENTION

To achieve the objects mentioned above, a hybrid power generation system is provided according to the present invention.

The hybrid power generation system comprises:
a base frame configured to be rotatable on a main rotation shaft by a rotating means;
a wind collecting duct provided on one end of the base frame to introduce wind inside, increasing a speed of the introduced wind, and discharging the wind with increased speed;
a turbine module provided on a rear of the wind collecting duct from which the wind is discharged and including a power generation rotation shaft and a blade installed on the power generation rotation shaft, wherein the blade to which the wind discharged from the wind collecting duct is provided rotates the power generation rotation shaft;
a generator connected to the power generation rotation shaft and generating electric energy by a rotational force of the power generation rotation shaft;
a battery electrically connected to charge and discharge the electric energy generated by rotation of the turbine module;
a photovoltaic module concentration device generating electric energy from one or more solar cell and electrically connected to a wind inducing rotation motor provided on one side of the wind collecting duct to supply the electric energy to the wind inducing rotation motor;
a wind speed sensor installed on the wind collecting duct to measure a wind speed value, which is a strength of wind;
a main control unit controlling the system by generating and transmitting an energy supplying signal and allowing the electric energy obtained from the photovoltaic module concentration device to be provided to a wind inducing means connected to a wind inducing rotation shaft of the wind inducing rotation motor, when the wind speed value received from the wind speed sensor is less than a preset reference wind speed value to the extent that the generator cannot produce electric energy, and
a wind recollecting means disposed at a rear of the turbine module, recollecting wind escaping from the rear of the turbine module among wind discharged from the wind collecting duct, and resupplying the recollected wind to a front portion of the turbine module or a front portion or a middle portion of the wind collecting duct.

The present invention will become more apparent from the detailed description below with reference to the accompanying drawings.

The terms or words used in the present descriptions and claims should not be construed as ordinary meanings or meanings in dictionary. The terms or words used in the present descriptions and claims should be interpreted as meanings and concepts consistent with the technical spirit of the present invention based on the principle that the inventor can appropriately define the terms to best describe the invention.

TECHNICAL EFFECTS OF THE INVENTION

According to an embodiment of the present invention, a hybrid power generation system can increase an amount of power generation by including a photovoltaic module concentration device on the system, driving a motor provided in a wind collecting duct to operate a wind inducing means using electric energy generated by the photovoltaic module concentration device, even when wind does not blow, and artificially creating high speed wind.

In addition, according to an embodiment of the present invention, a hybrid power generation system can detect a potential danger of the hybrid power generation system in advance, by using technologies based on Internet of Things (IoT) and Artificial Intelligence (AI), such as a camera, a fire detection sensor, a drone, and the like. Accordingly, the system can reduce a risk of breakdown and operate efficiently.

Furthermore, according to an embodiment of the present invention, wind collected inside a wind collecting duct is accelerated through a wind collecting duct, and only forward wind in which backwind is excluded, is discharged from an outlet and introduces into a blade wind collecting room. Accordingly, a rotational force, a centrifugal force, a rotation speed, and a rotation torque of the blade increase, and they improve power generation energy efficiency. In addition, an inlet of the wind collecting duct automatically rotates in a wind direction by a wind steering and a rotating means installed on both sides of a support of a photovoltaic module concentration device on a top end of a base frame, thereby maximizing wind collecting efficiency.

Furthermore, according to an embodiment of the present invention, an airflow volume control rotating door automatically rotates and moves along an airflow volume control guide rail based on an input value of wind discharged from a wind collecting duct. Thus, a volume of wind discharged from an outlet and supplied to a blade can be controlled. Accordingly, by controlling an airflow volume control rotating door, it is possible to prevent excessive wind, such as typhoon, from being supplied to a turbine module and prevent breakdown of the turbine module.

In addition, according to an embodiment of the present invention, a windshield fence surrounding a part of a turbine module is provided on one side of a path through which wind is recollected by a wind recollecting member and resupplied to the turbine module. Thus, an outlet of a wind collecting duct receives only forward wind from the turbine module, a blade is not affected by reverse rotation of backwind, and thus, a rotational force of the blade is not reduced. As a result, turbine module efficiency and an amount of power generation increases, and breakdown of the turbine module can be prevented.

Moreover, according to an embodiment of the present invention, when wind does not blow, electricity is generated using a photovoltaic module concentration device, and a wind inducing means installed in a wind collecting duct is forcibly operated with this power to increase a wind speed to further increase an amount of electricity generated by rotating the generator. That is, electricity can be produced by using wind energy and solar energy at the same time. In addition, a lightning arrester provided on a photovoltaic module concentration device can protect the hybrid power generation system by guiding lightning to the ground. This structure can solve problems of a conventional horizontal shaft generator that induces lightning and causes breakdown.

BEST MODE FOR THE INVENTION

The specific aspects and technical features of the present invention will become more apparent from the accompanying drawings, the following detailed description, and embodiments. In adding reference numbers to components of each drawing, the same components have the same reference numbers even if they are indicated on different drawings. In addition, in describing an embodiment of the present invention, if detailed description of a known related configuration or function may obscure the gist of the present invention, the detailed description thereof will be omitted.

In addition, in describing components or elements of the present invention, terms such as first, second, A, B, a, b, and the like may be used. These terms are only used to distinguish a component from other components, and the essence, order, or step of the component or element is not limited by the terms. When a component or element is described as being "connected" or "coupled" to another component or element, the component or element may be directly connected or coupled to the other component or element, but it should be understood that another component or element may be "connected" or "coupled" between the components or elements.

Hereinafter, embodiments of the present invention will be described in detail with reference to the accompanying drawings.

Figure 1:
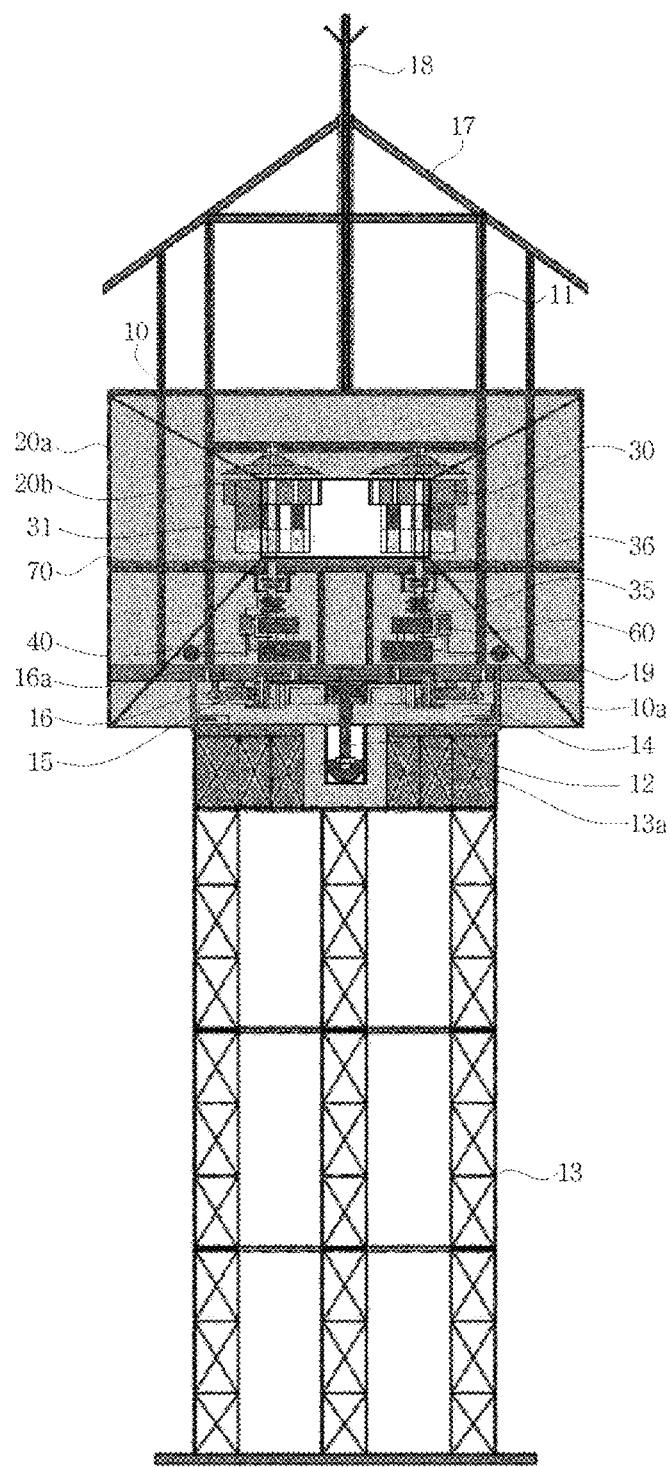
FIG. 1 is a front view illustrating a structure in which turbine modules are arranged in two rows of a front row and a rear row in a hybrid power generation system according to an embodiment of the present invention.
Figure 2A:
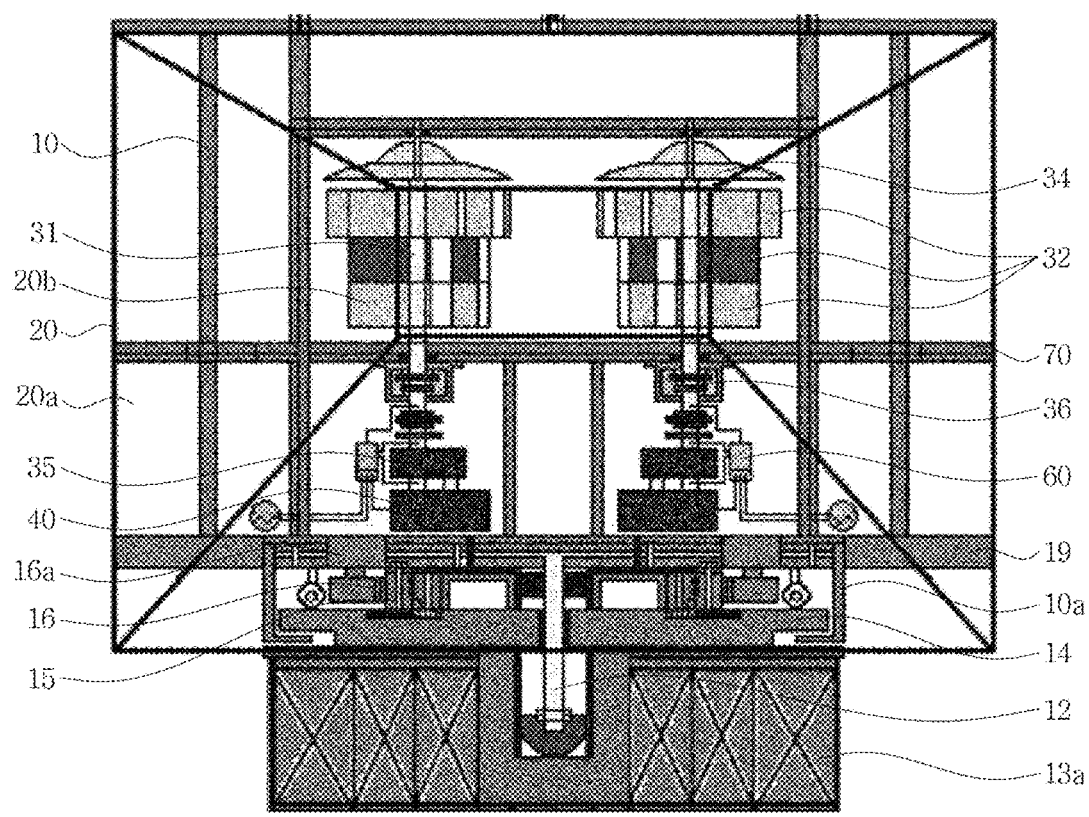
FIGS. 2A to 2C are magnified views illustrating a main part of the hybrid power generation system of FIG. 1.
Figure 2B:
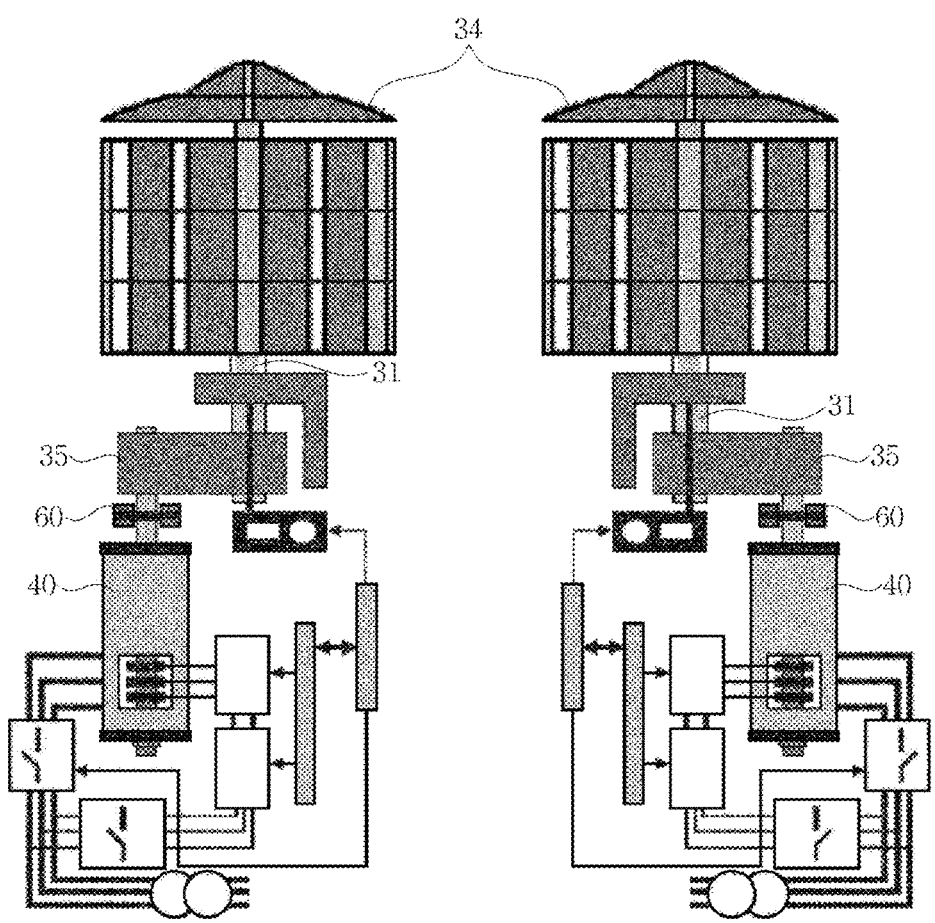
Figure 2C:
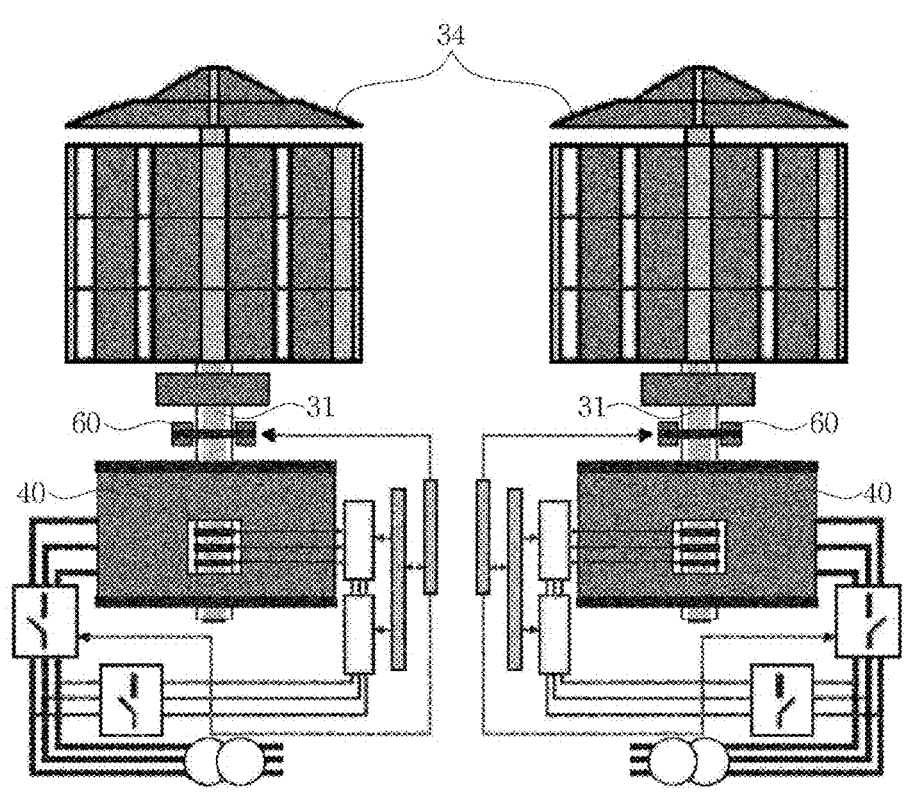
Figure 3:
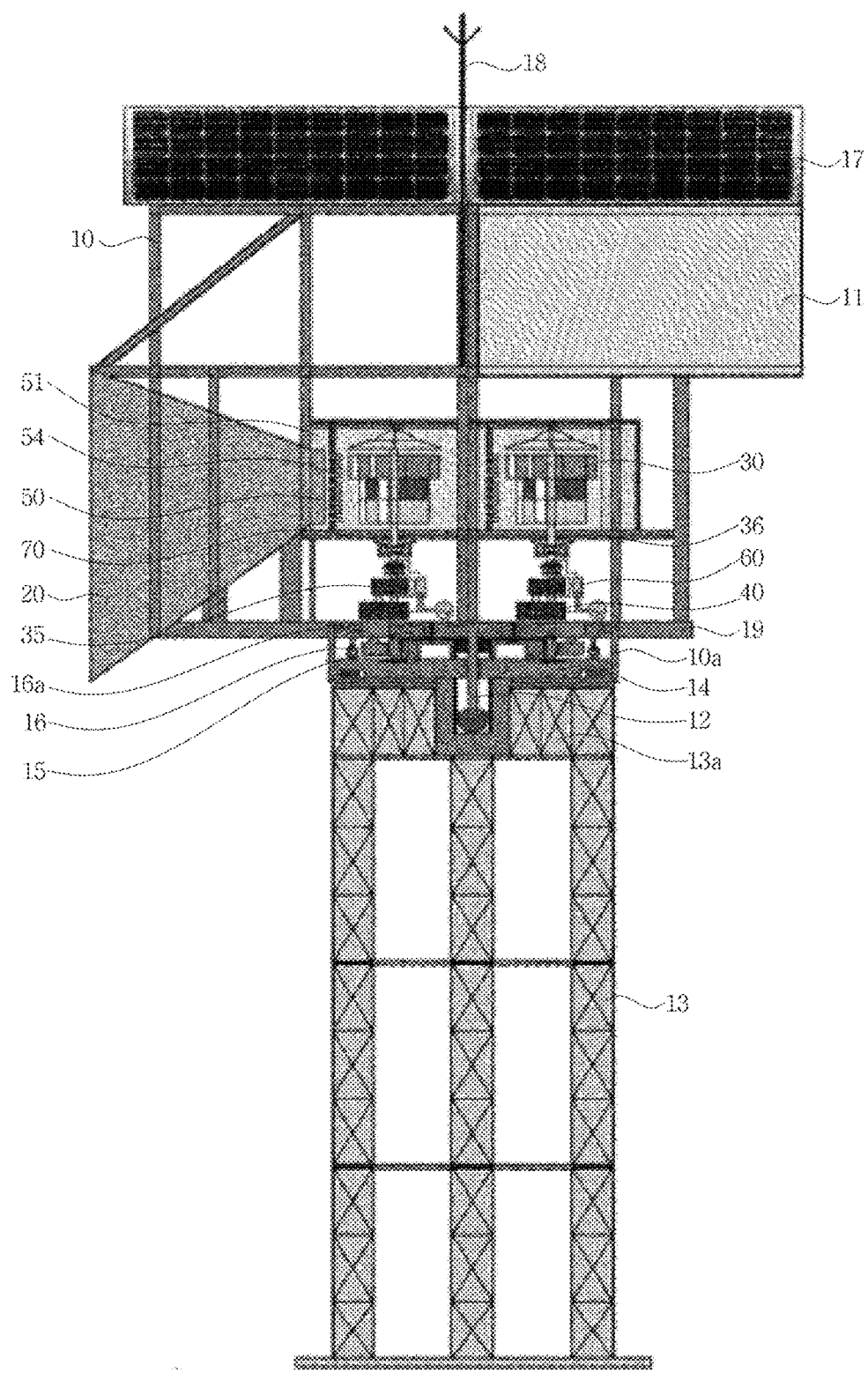
FIG. 3 is a side view illustrating the hybrid power generation system of FIG. 1.
Figure 4:
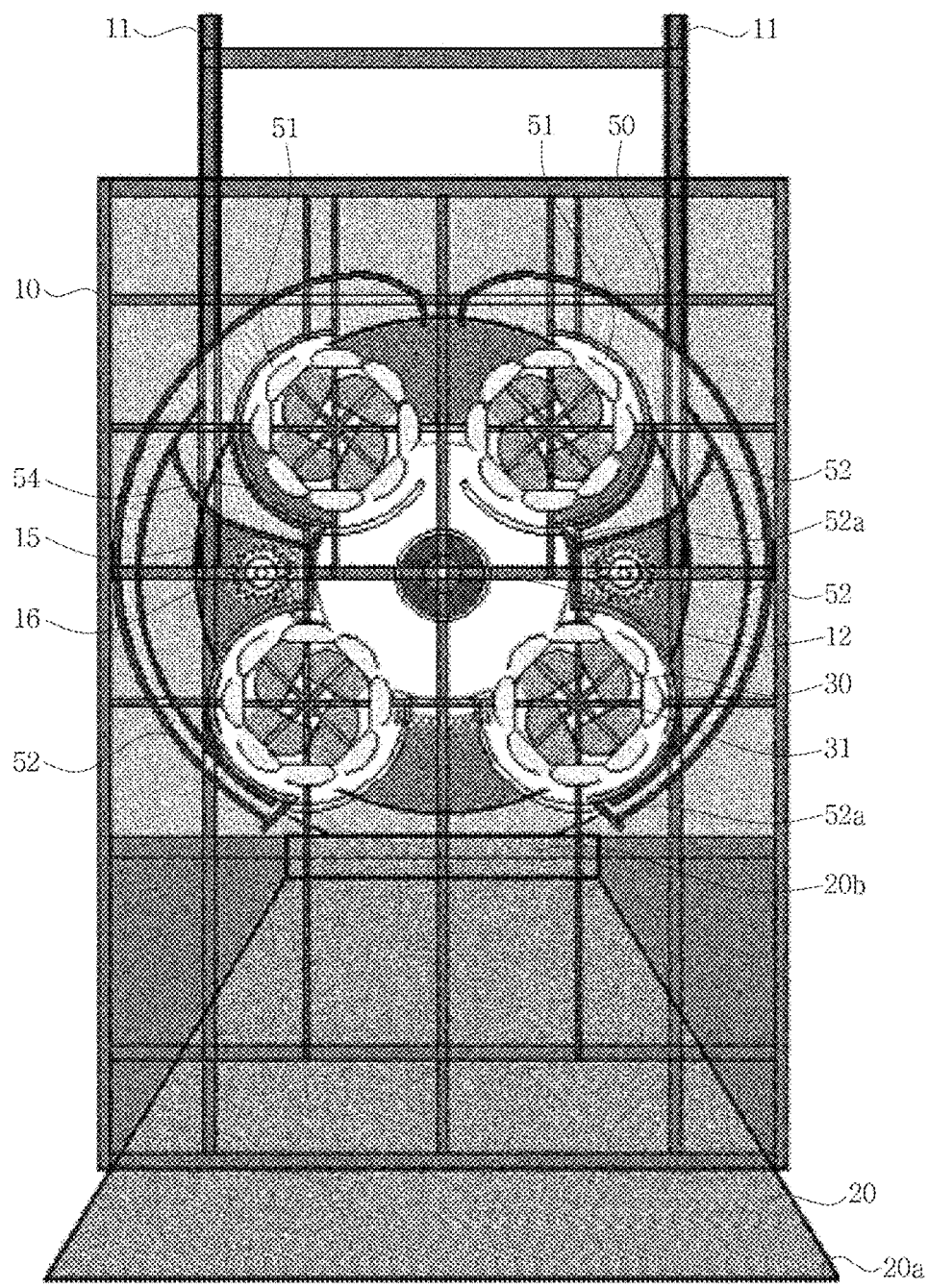
FIG. 4 is a top view illustrating the hybrid power generation system of FIG. 1.
Figure 5:
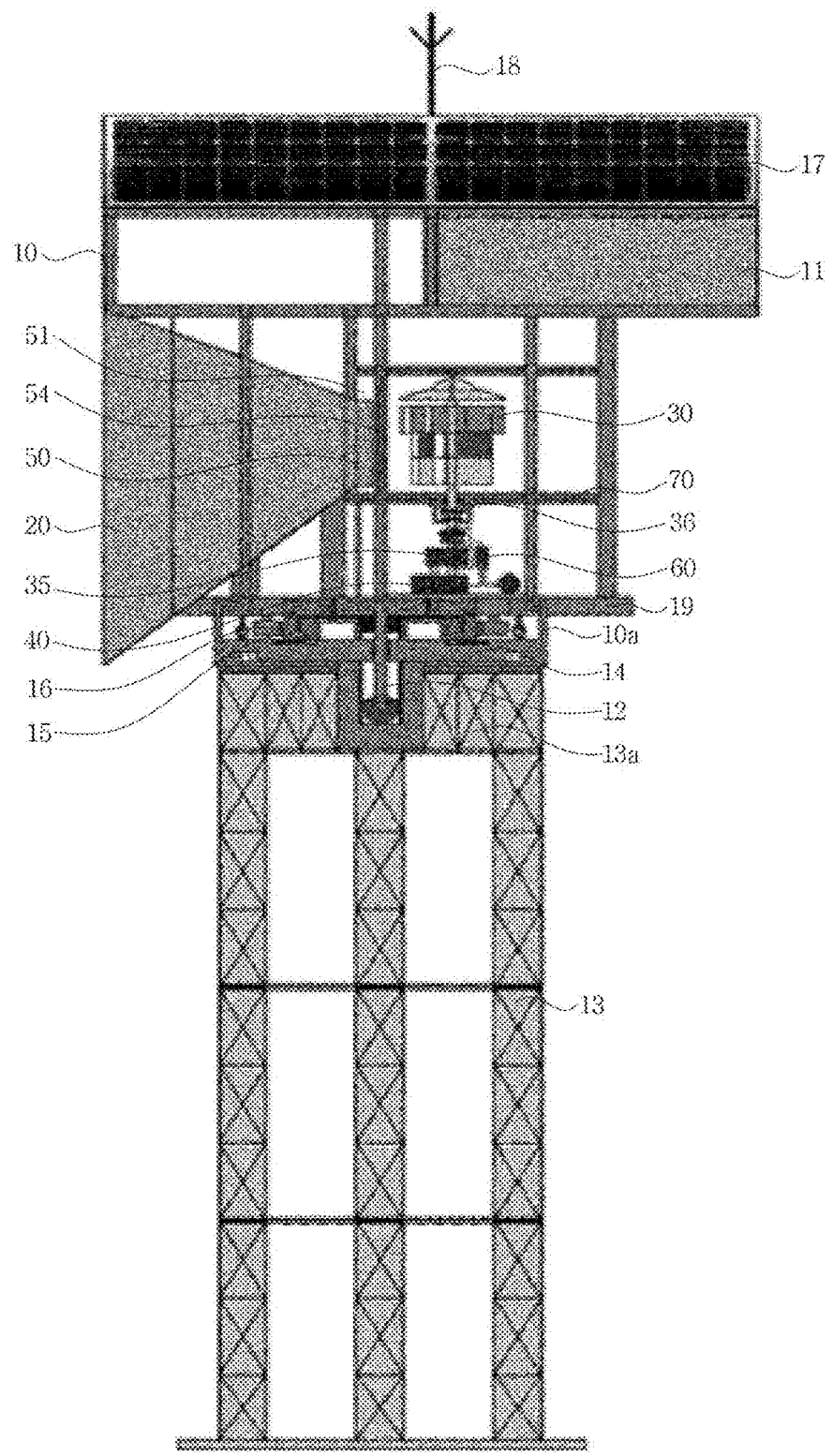
FIG. 5 is a side view illustrating a structure in which turbine modules are arranged in single row in a hybrid power generation system according to an embodiment of the present invention.
Figure 6:
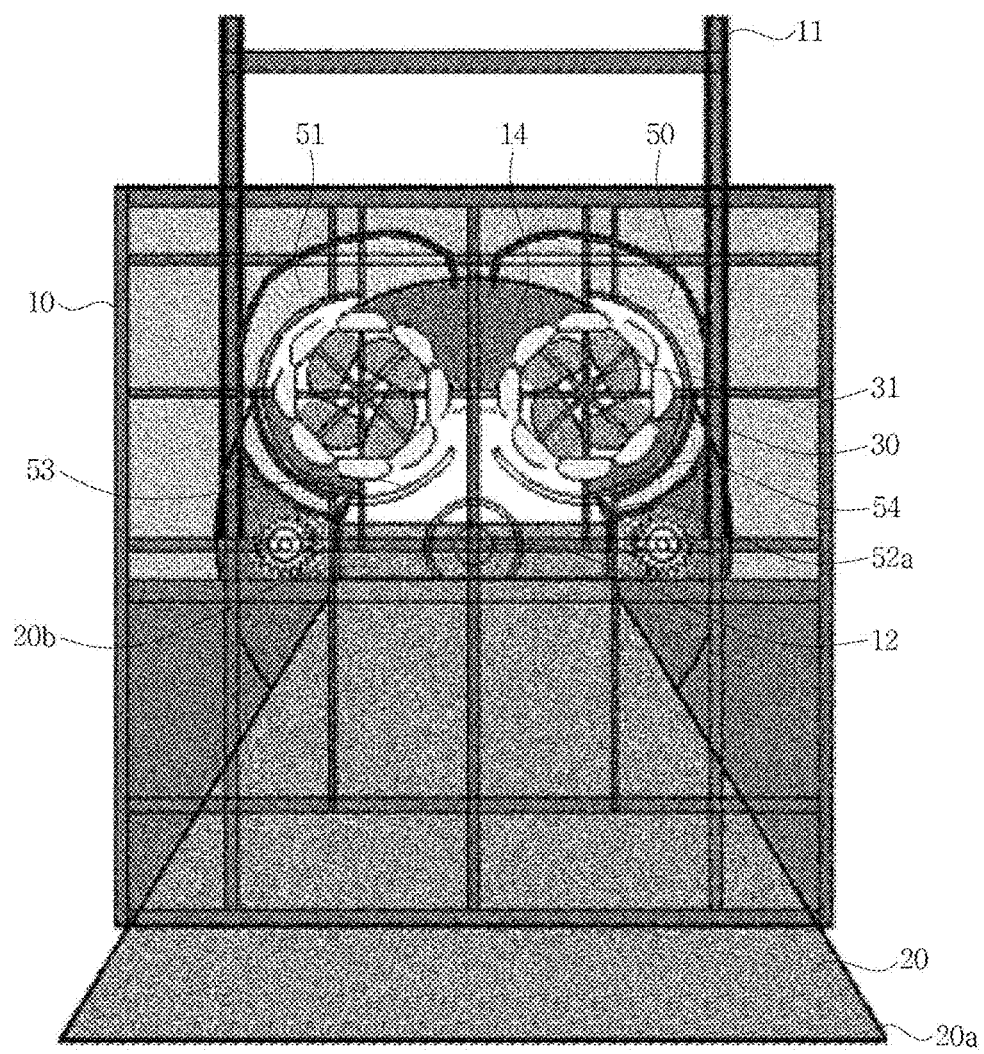
FIG. 6 is a top view illustrating the hybrid power generation system of FIG. 5.
Figure 7:
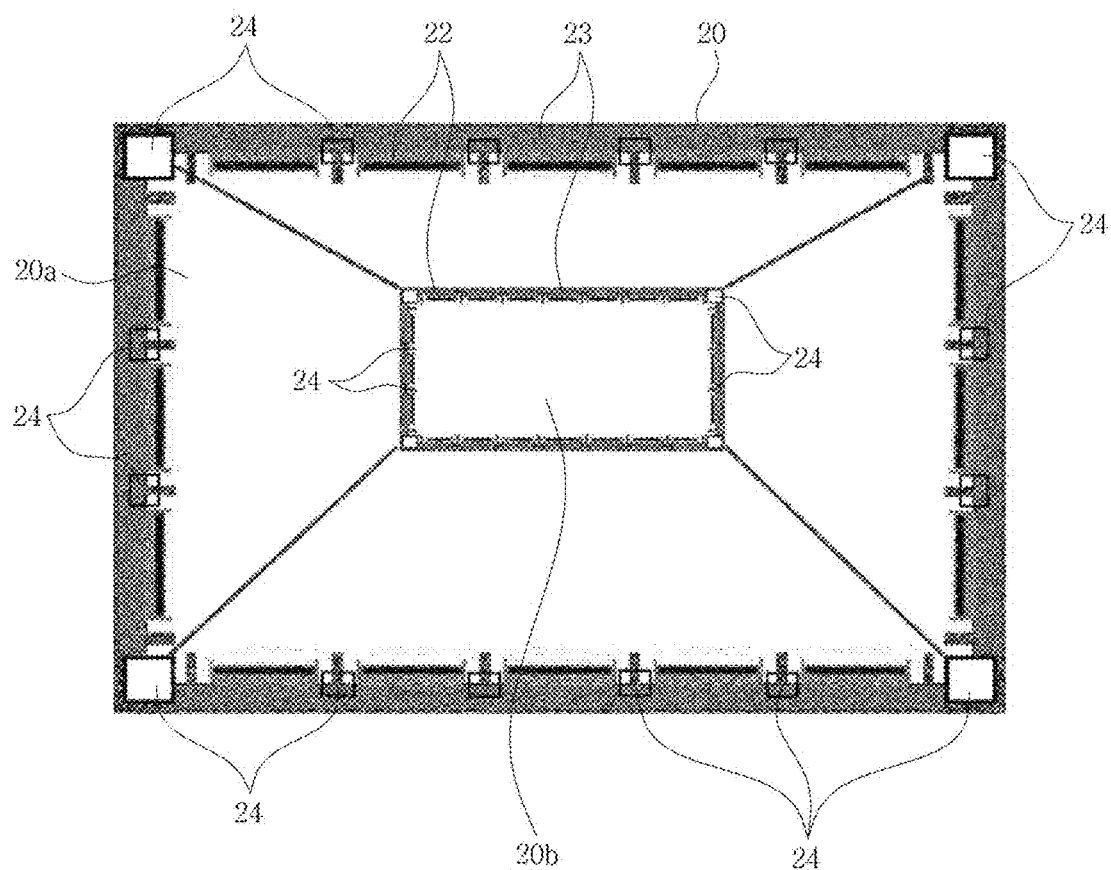
FIG. 7 is a drawing illustrating a shape viewed from a front of an inlet of a wind collecting duct in order to explain configuration of a wind inducing means installed in the wind collecting duct according to an embodiment of the present invention.
Figure 8:
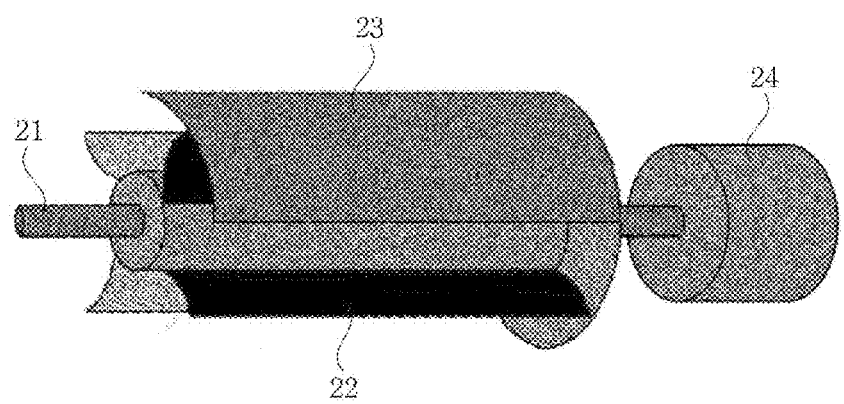
FIG. 8 is a drawing illustrating a wind inducing means viewed from a front of a wind collecting duct according to an embodiment of the present invention.
Figure 9:
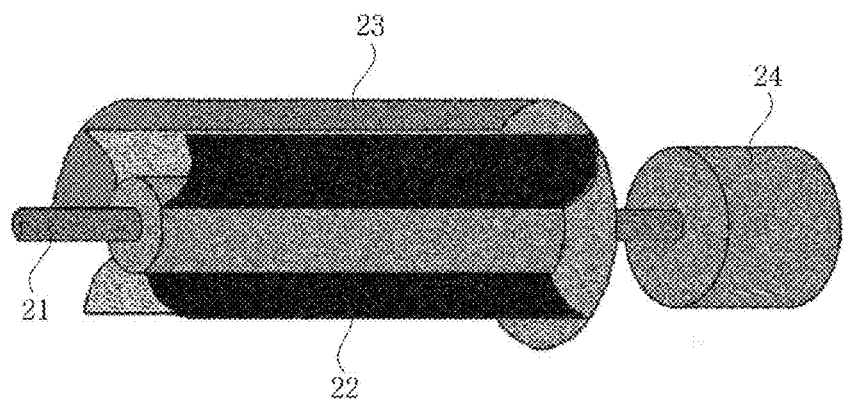
FIG. 9 is a drawing illustrating a wind inducing means viewed from a rear of a wind collecting duct according to an embodiment of the present invention.
Figure 10:
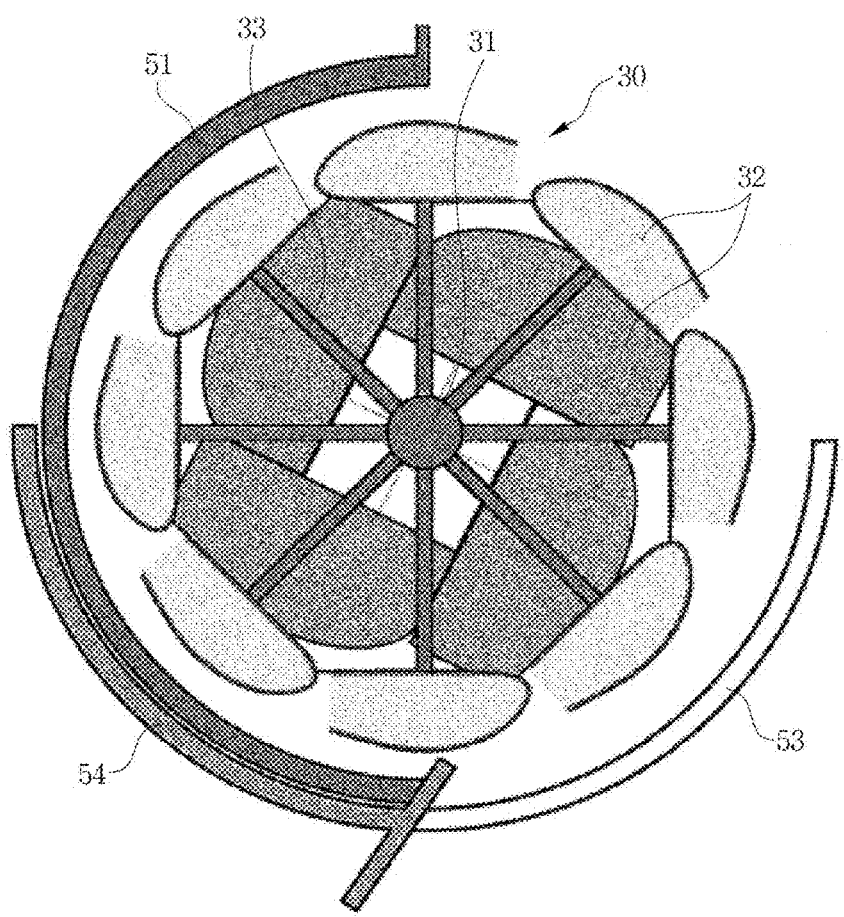
FIG. 10 is a schematic top view illustrating configurations of a turbine module and elements for controlling airflow volume according to an embodiment of the present invention.
Figure 11:
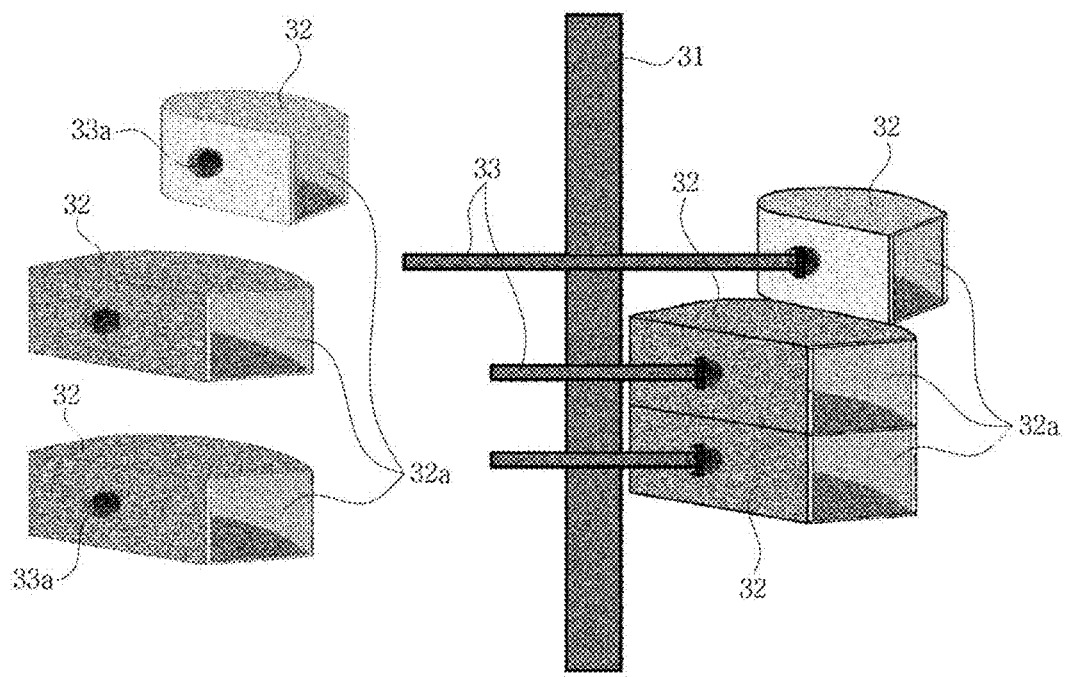
FIG. 11 is an exploded view illustrating some parts of a turbine module before assembly according to an embodiment of the present invention.
Figure 12:
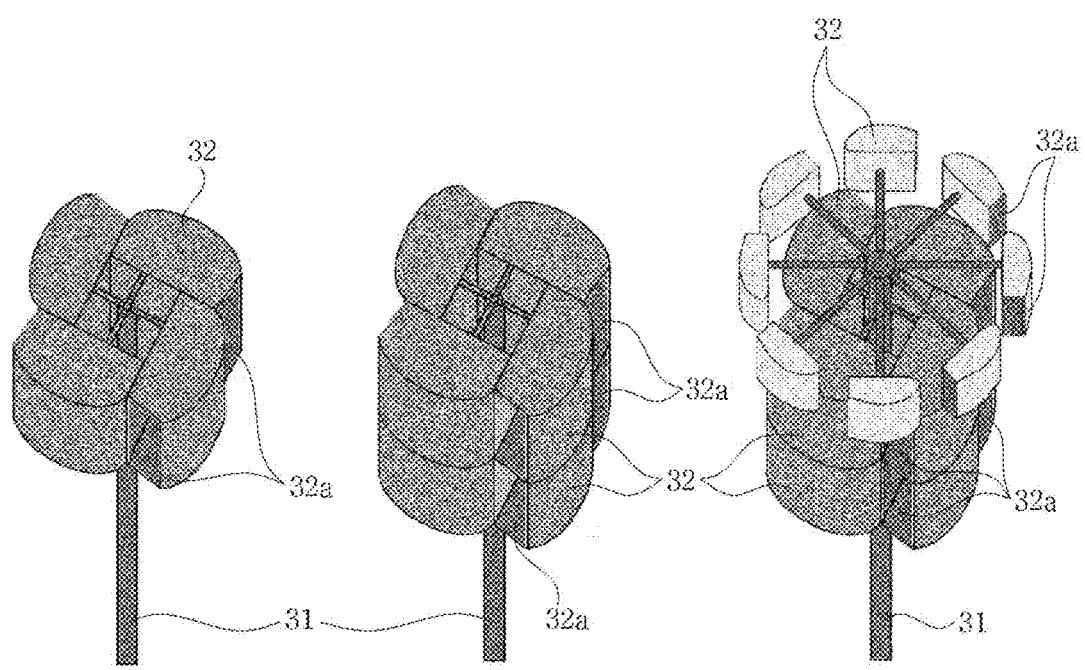
FIG. 12 is a drawing illustrating a turbine module in which two types of blades having different shapes are coupled in a three-story stack according to an embodiment of the present invention.
Figure 13:
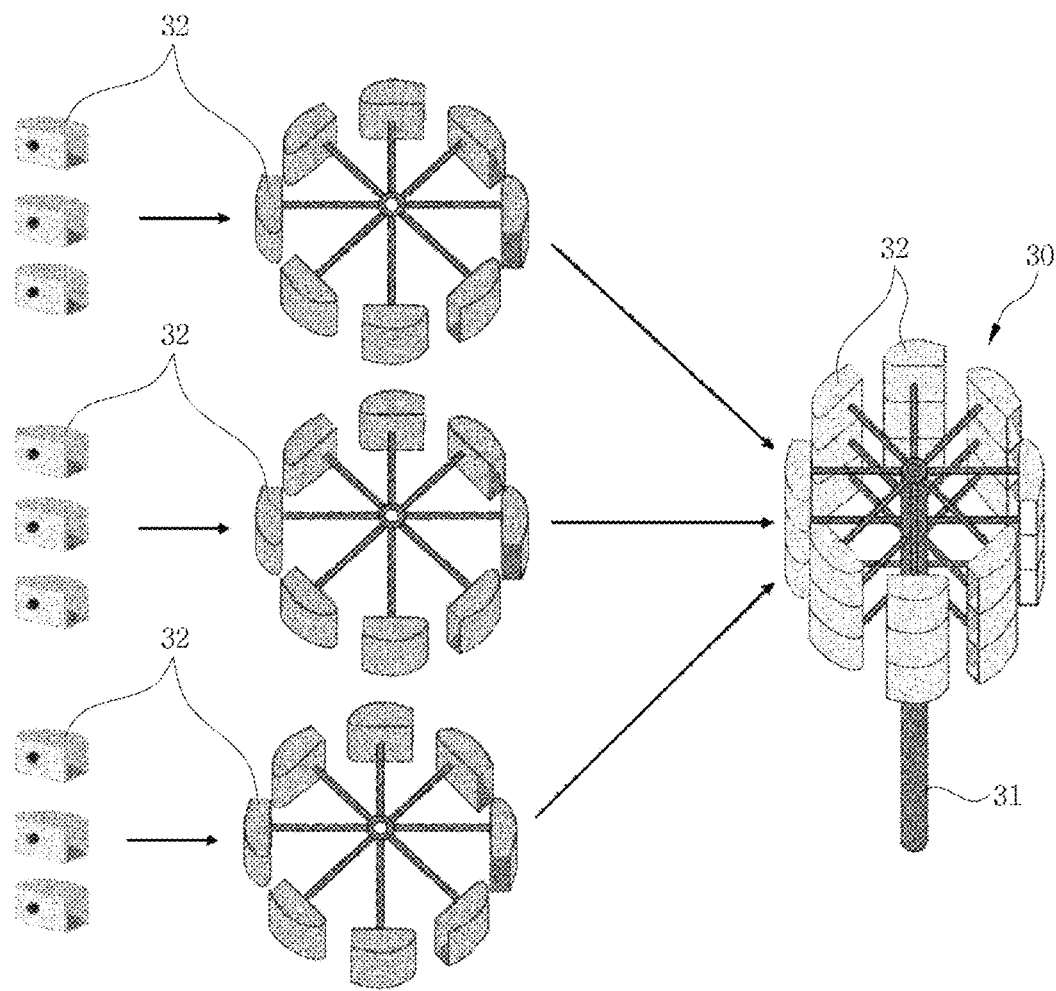
FIG. 13 is a drawing illustrating a turbine module before and after assembly in which blades having an identical shape are coupled in a three-story stack according to an embodiment of the present invention.
Figure 14A:
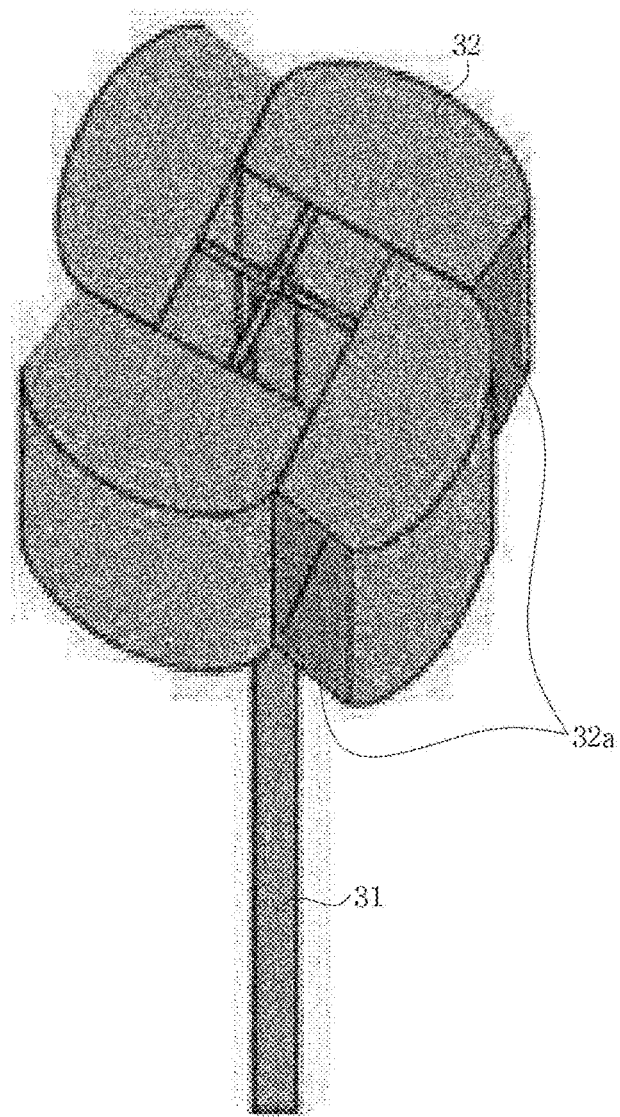
FIGS. 14a to 14j are drawings illustrating turbine modules configured by different combinations of the shape and number of blades in according to embodiments of the present invention.
Figure 14B:
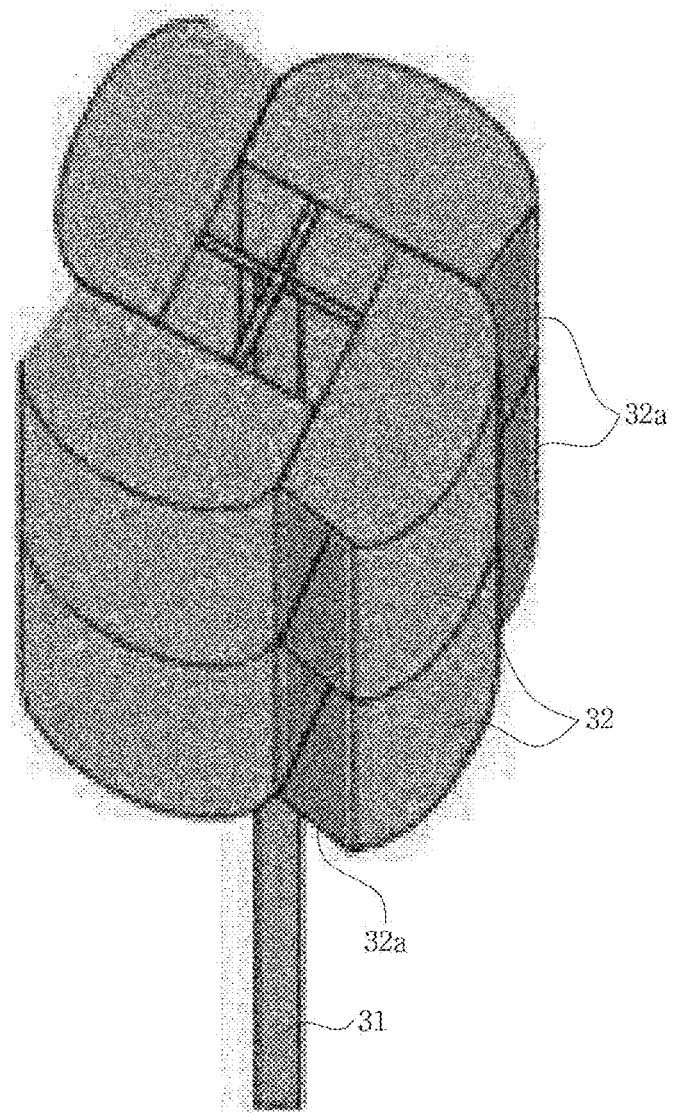
Figure 14C:
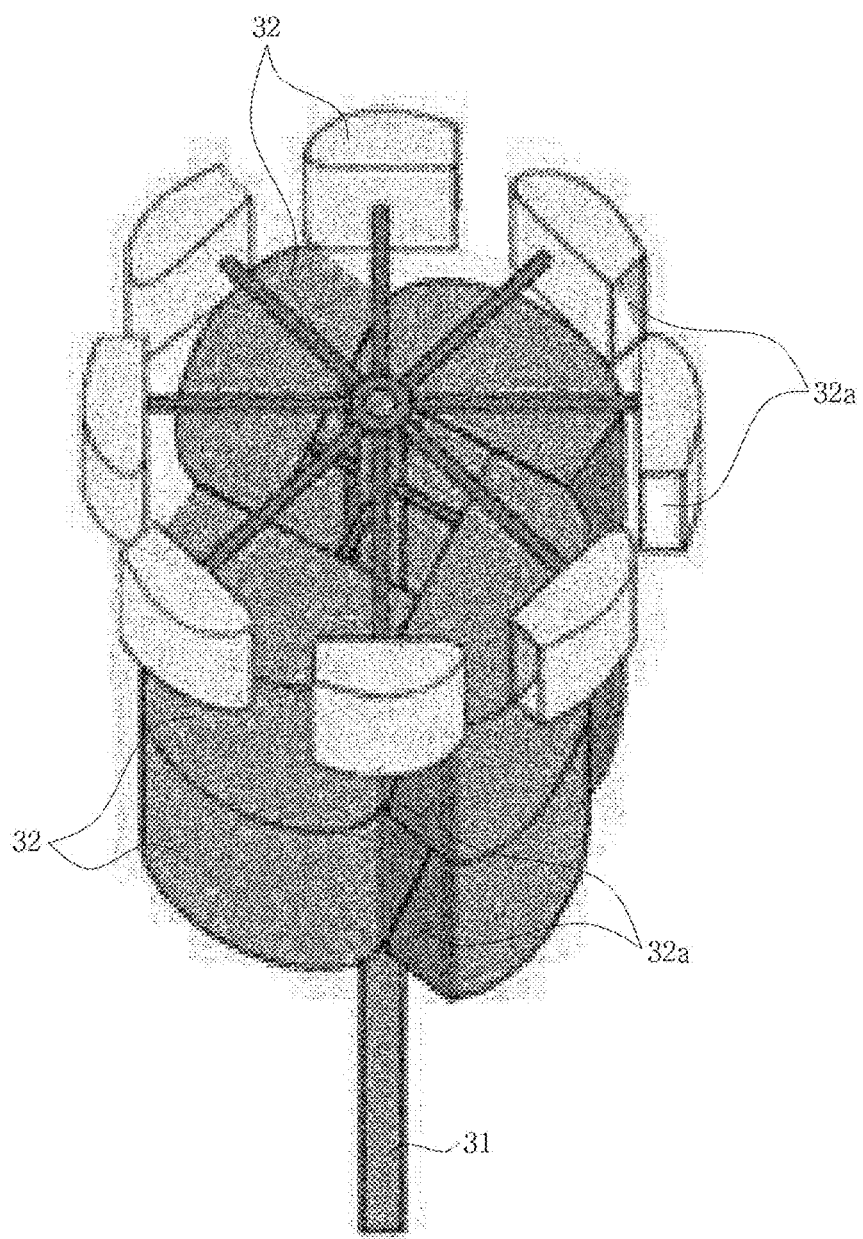
Figure 14D:
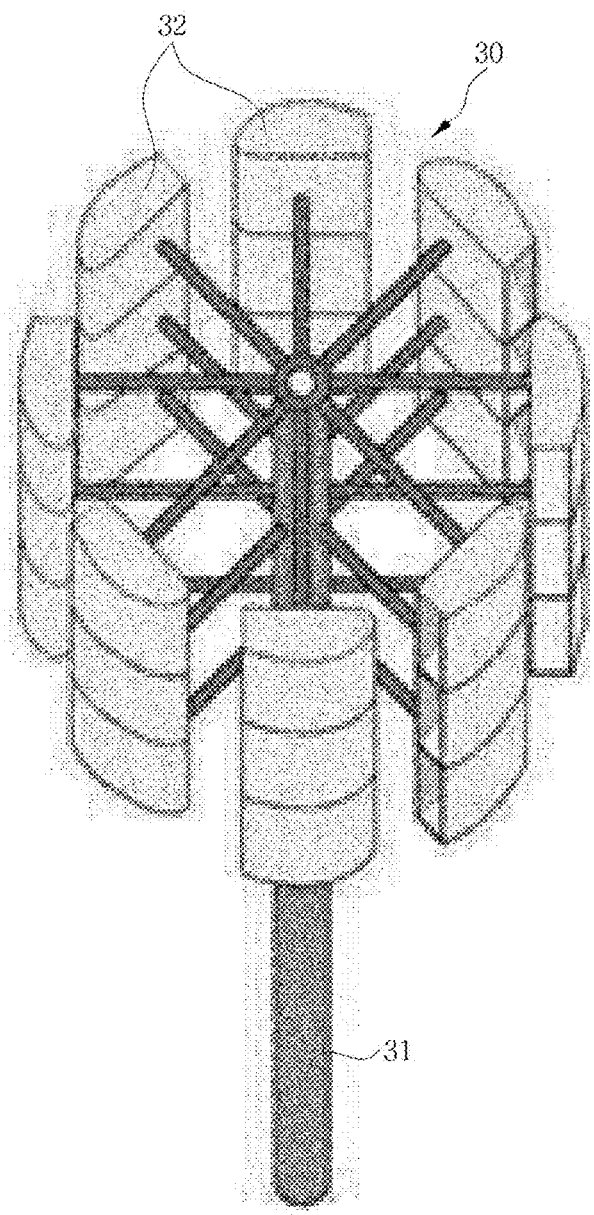
Figure 14E:
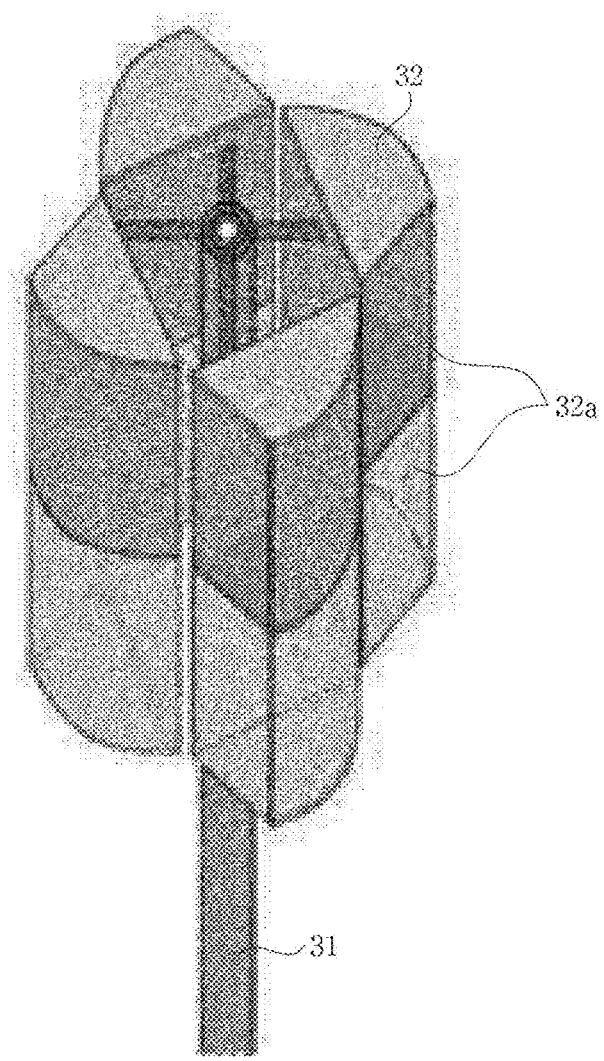
Figure 14F:
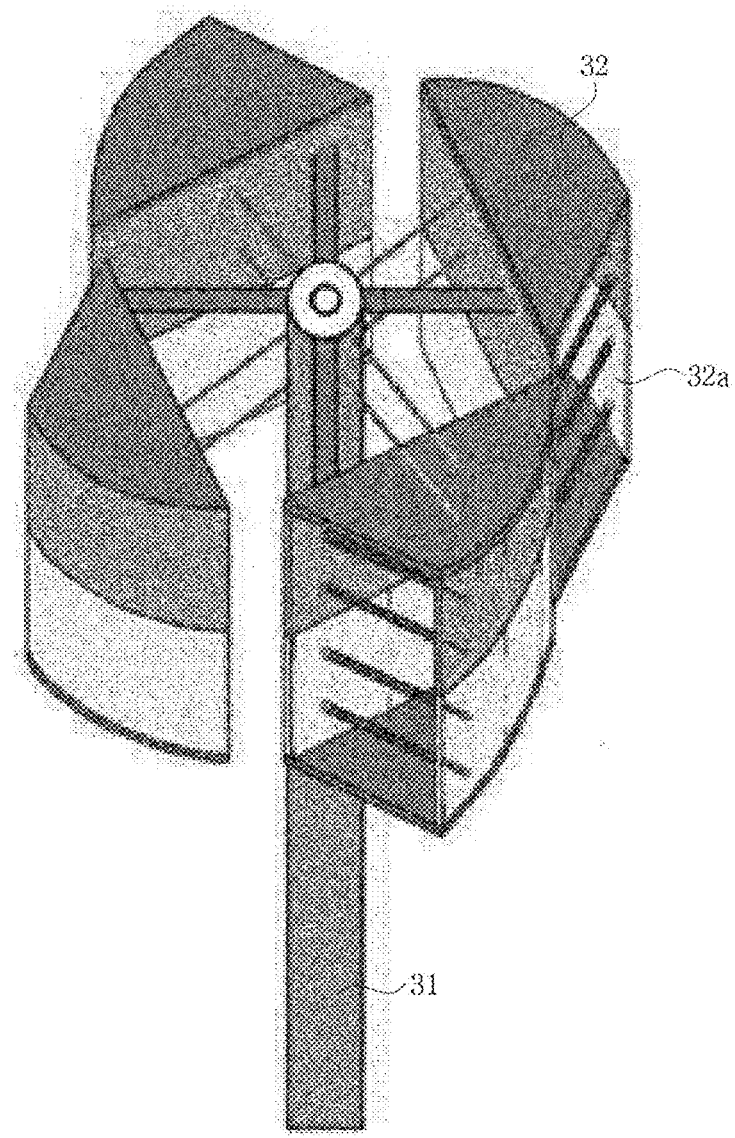
Figure 14G:
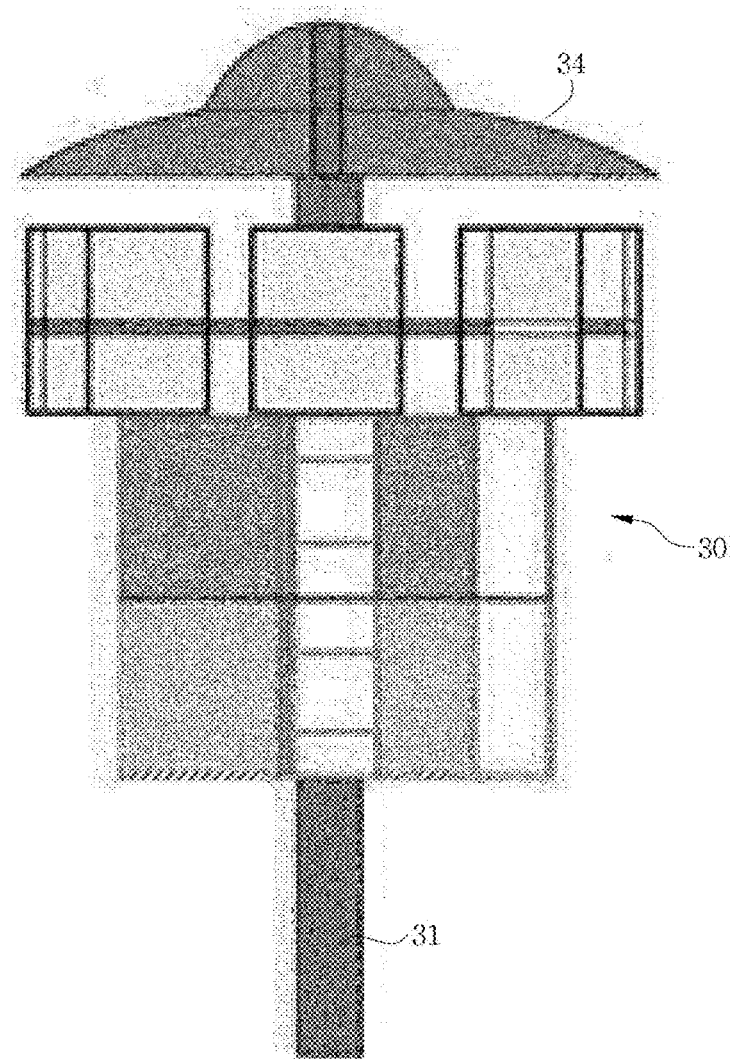
Figure 14H:
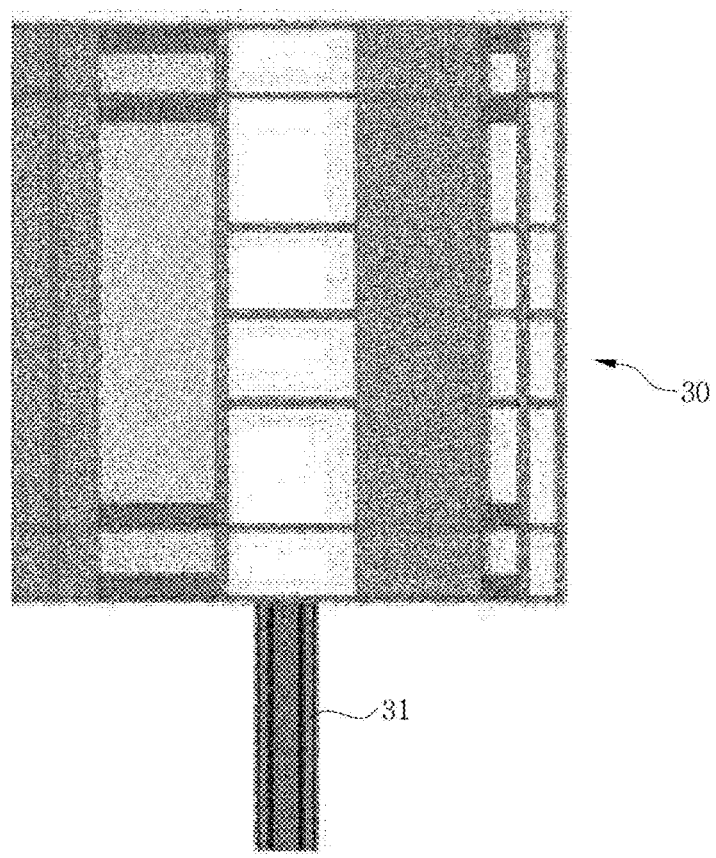
Figure 14I:
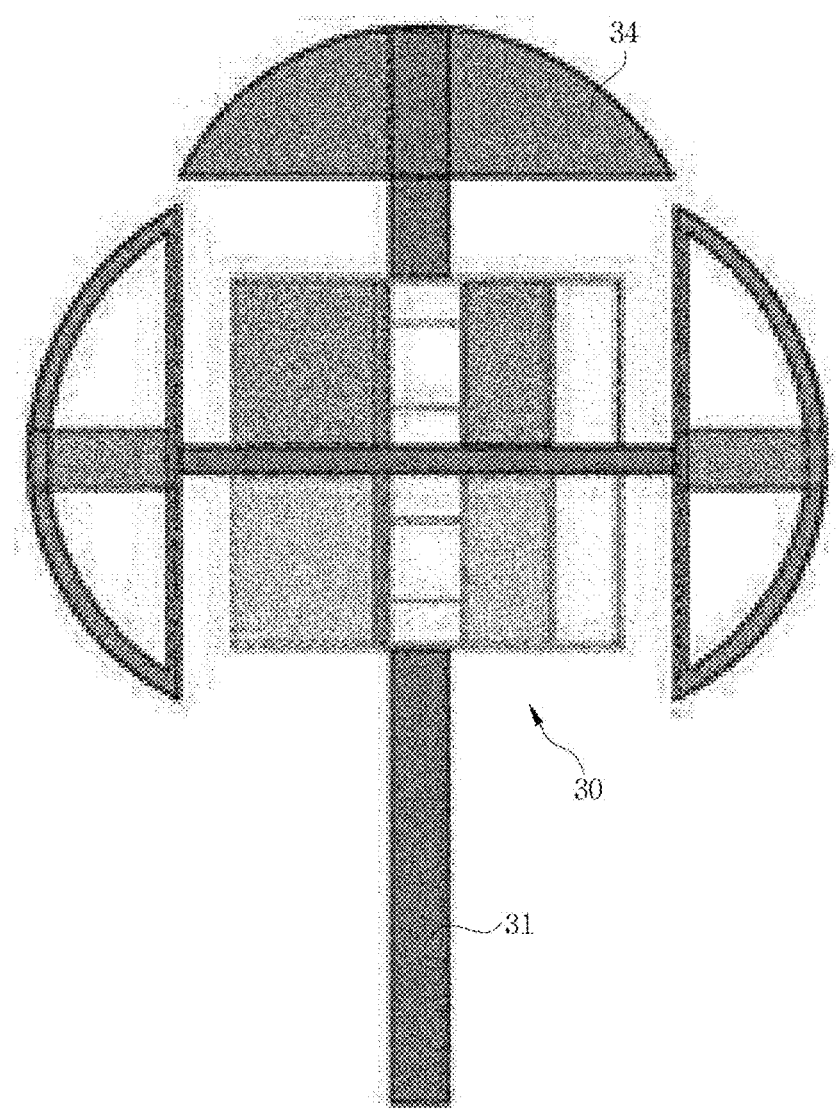
Figure 14J:
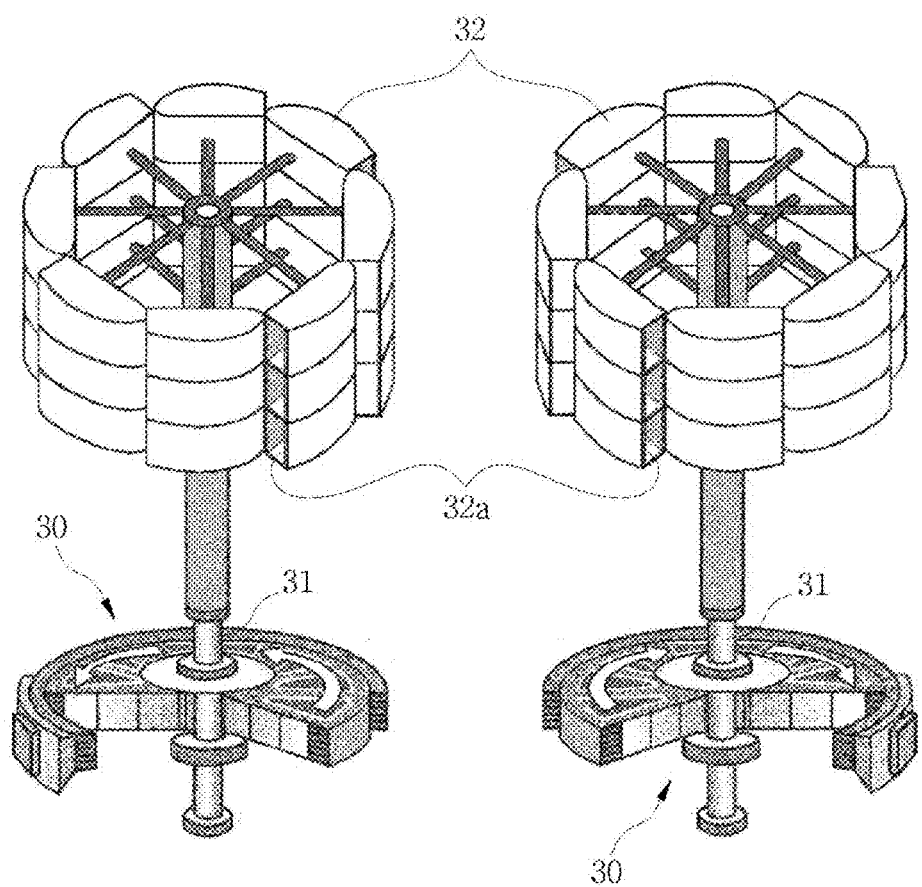
Figure 15:
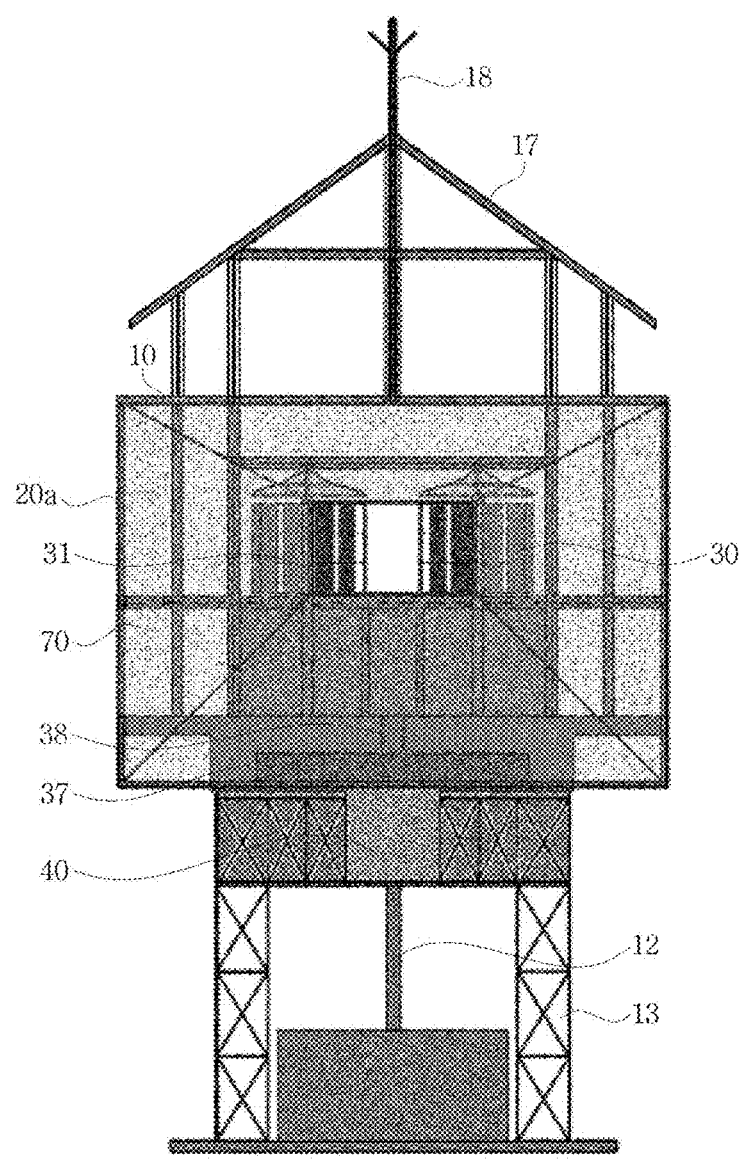
FIG. 15 is a front view illustrating a hybrid power generation system according to an embodiment of the present invention.
Figure 16:
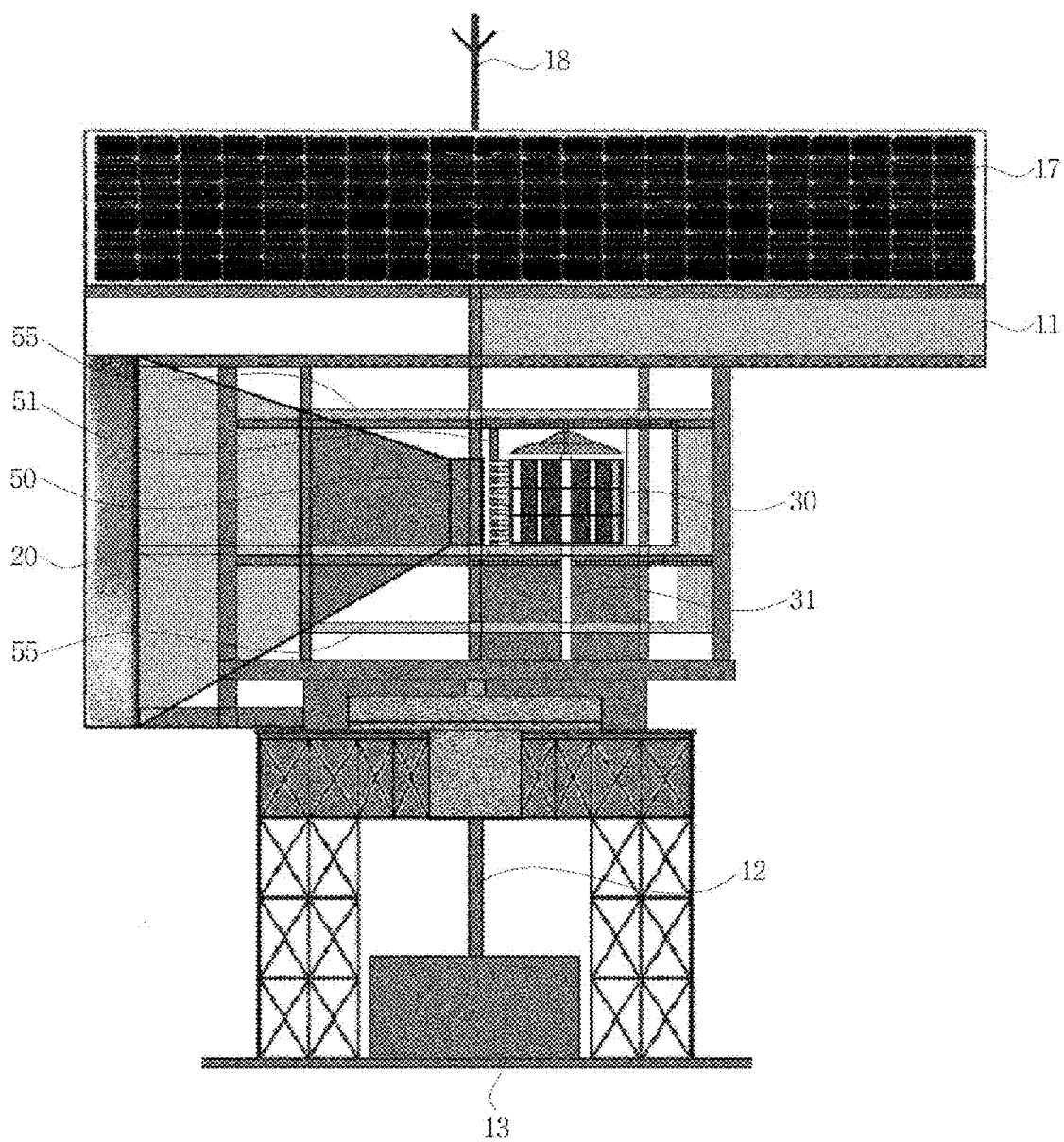
FIG. 16 is a side view illustrating the hybrid power generation system of FIG. 15.

FIG. 1 is a front view illustrating a structure in which turbine modules are arranged in two rows of a front row and a rear row in a hybrid power generation system according to an embodiment of the present invention. FIGS. 2A to 2C are magnified views illustrating a main part of the hybrid power generation system of FIG. 1. FIG. 3 is a side view illustrating the hybrid power generation system of FIG. 1. FIG. 4 is a top view illustrating the hybrid power generation system of FIG. 1. FIG. 5 is a side view illustrating a structure in which turbine modules are arranged in single row in a hybrid power generation system according to an embodiment of the present invention. FIG. 6 is a top view illustrating the hybrid power generation system of FIG. 5. FIG. 7 is a drawing illustrating a shape viewed from a front of an inlet of a wind collecting duct in order to explain the configuration of a wind inducing means installed in the wind collecting duct according to an embodiment of the present invention. FIG. 8 is a drawing illustrating a wind inducing means viewed from a front of a wind collecting duct according to an embodiment of the present invention. FIG. 9 is a drawing illustrating a wind inducing means viewed from a rear of a wind collecting duct according to an embodiment of the present invention. FIG. 10 is a schematic top view illustrating configurations of a turbine module and elements for controlling wind volume with the turbine module according to an embodiment of the present invention. FIG. 11 is an exploded view illustrating some parts of a turbine module before assembly according to an embodiment of the present invention. FIG. 12 is a drawing illustrating a turbine module in which two types of blades having different shapes are coupled in a three-story stack according to an embodiment of the present invention. FIG. 13 is a drawing illustrating a turbine module before and after assembly in which blades having an identical shape are coupled in a three-story stack according to an embodiment of the present invention. FIGS. 14a to 14j are drawings illustrating turbine modules configured by different combinations of the shape and number of blades in according to embodiments of the present invention.

FIGS. 1 to 14j, a hybrid power generation system according to an embodiment of the present invention includes a power generation device and a system for operating and managing the same.

The power generation device includes: a base frame 10 configured to be rotatable by a rotating means on a main rotation shaft 12; a wind collecting duct 20 provided on one end of the base frame 10 to introduce wind inside, increasing a speed of the introduced wind, and discharging the wind with increased speed; a turbine module 30 provided on a rear of the wind collecting duct from which the wind is discharged and including a power generation rotation shaft 31 and a blade 32 installed on the power generation rotation shaft 31, wherein the blade 32 to which the wind discharged from the wind collecting duct 20 is provided rotates the power generation rotation shaft 31; a generator 40 connected to the power generation rotation shaft 31 and generating electric energy by a rotational force of the power generation rotation shaft 31, and a photovoltaic module concentration device 17.

Since the wind collected inside the wind collecting duct 20 is accelerated through the wind collecting duct 20 and discharged to the blade 32, a rotational force and a centrifugal force of the blade 32 increase. Accordingly, a rotational speed and a rotational torque of the blade 32 increases, and thus, the power generation efficiency is greatly improved.

Viewed from a front of an inlet 20a of the wind collecting duct 20 to which the wind is introduced, the shape of the inlet 20a may be a rectangle, a cylindrical shape, a round rectangle, or the like. For the wind collecting duct 20 configured in a large size, the wind collecting duct 20 can be configured as separated parts and can be assembled on site for ease of transport and work. In this case, the wind collecting duct 20 may be configured to be separated horizontally or vertically.

In addition, if each plate of the wind collecting duct 20 is too large, it may be configured to be separated vertically and/or horizontally, and thus, transport and workability on site can be further improved.

Referring to FIGS. 3 to 5, a wind steering 11 is provided on the other end of the base frame 10 of the present invention. With the wind steering 11, the base frame 10 can be rotated by the wind, and one end of the base frame 10 can automatically rotate toward a wind direction, a direction from which the wind blows.

Specifically, since a wind receiving surface formed by the two wind steerings 11, which are provided on both sides of a rear end of the base frame 10 and face each other, stands upright with respect to the wind direction, the inlet 20a of the wind collecting duct 20 automatically rotates toward the wind direction, and thus, the wind collecting efficiency is maximized.

Referring to FIGS. 1, 2a to 2c, and 3, the rotating means in the present invention may be configured to include: a main rotation shaft 12 provided vertically at the bottom end of the base frame 10; a post 13 the top end of which the main rotation shaft 12 is rotatably installed on and that supports the bottom portion of the base frame 10; a support plate 14 fixed to the top end of the post 13 and coupled with the main rotation shaft 12 passing therethrough; a vertical motion gear 15 fixed to the support plate 14 and provided on a concentric axis with the main rotation shaft 12; the base frame 10 rotating, and a driving gear 16 preferably coupled to the base platform 19 and rotating in gear with the vertical motion gear 15.

In this case, a support frame 13a may be fixed between the post 13 and the support plate 14 and may not rotate, enable the main rotation shaft 12 to rotate smoothly in a vertical state, and be configured to prevent the base frame 10 and the base platform 19 from collapsing by strong winds.

The post 13 may be configured to have four columns or one cylindrical column perpendicular to the ground, such as a steel structure or a cylindrical structure, and may fixedly installed on the ground or the floor of the structure. The top portion of the support frame 13a may be fixedly coupled to the bottom portion of the support plate 14.

That is, the post 13 may be either a steel tower or a cylindrical tower. With this configuration, when constructing the power device on site, it is possible to use a prefabricated steel structure that is easy to install. Therefore, installation cost is lower than that of a conventional horizontal shaft wind generator when constructing on site, and thus, the present invention can be installed more economically.

In addition, the top end of a collapse prevention frame 10a is fixed to the bottom part of the base platform 19 attached to the bottom part of the base frame 10 with the main rotation shaft 12 as a center. The bottom end of the collapse prevention frame 10a is bent inward and caught on the top end of the support plate 14, and thus, the base frame 10 and all the mechanical equipment connected to the base frame 10 and mounted on the base platform 19 are prevented from collapsing or fallen down.

In particular, the rotating means may be configured to further include a wind direction rotation motor 16a providing a rotational force to a driving gear 16.

That is, since the vertical motion gear 15 is fixed to the post 13 by the support plate 14, when the driving gear 16 is rotated by a rotational force provided by the wind direction rotation motor 16a, the driving gear 16 engaged with the vertical motion gear 15 rotates with respect to the vertical motion gear 15, and thus, the base frame 10 can rotate together.

In addition, in order to control the wind direction rotation motor 16a, the present invention may further include: an angle measuring sensor for measuring a rotation angle of the main rotation shaft 12 by the wind steering 11, and a separate control unit for applying a driving signal to the wind direction rotation motor 16a when the rotation angle of the main rotation shaft 12 measured by the angle measurement sensor is equal to or greater than a reference angle.

That is, when the base frame 10 starts to rotate left or right according to the wind direction on the main rotation shaft 12 by the wind steering 11, and the rotation angle of the main rotation shaft 12 measured by the angle measuring sensor is greater than or equal to the reference angle, the wind direction rotation motor 16a is operated to rotate the base frame 10 in a direction in which the measured rotation angle is formed.

Accordingly, the inlet 20a of the wind collecting duct 20 installed in the base frame 10 can stably rotate toward the wind direction, thereby increasing the wind collecting efficiency.

In this case, the driving signal of the wind direction rotation motor 16a may be applied with a predetermined current for a predetermined time, thereby limiting excessive rotation of the base frame 10.

Meanwhile, referring to FIGS. 3 to 6, the wind collecting duct 20 of the present invention may be formed to have a cross-sectional area that is gradually narrower as it goes from the inlet 20a to the outlet 20b.

That is, the wind collecting duct 20 sucks in outside air through the inlet 20a, which has a relatively large area, and according to Bernoulli's law, the wind collecting duct 20 discharges the sucked outside air at a high speed through the outlet 20b, which has a relatively narrow area. Accordingly, the speed and force of the wind passing through the wind collecting duct 20 is concentrated, thereby greatly increasing wind energy supplied to the turbine module 30.

The cross section of the wind collecting duct 20 may have various shapes, such as a circular shape, a rectangular shape, as well as a rectangular shape illustrated in drawings.

In addition, the present invention may further include a wind inducing means installed inside the wind collecting duct 20 to introduce wind into the wind collecting duct 20 and increase the speed of the introduced wind.

Referring to FIGS. 7 to 9, the wind inducing means of the present invention may include: a wind inducing rotation shaft 21 installed along an edge of an inner surface of the inlet 20a or an edge of an inner surface of the outlet 20b of the wind collecting duct 20; a wind inducing rotation blade 22 rotatably installed on the wind inducing rotation shaft 21, and a wind inducing rotation motor 24 providing a rotational force to the wind inducing rotation shaft 21.

That is, the wind inducing rotation blade 22 forcibly sucks in outside air by the operation of the wind inducing rotation motor 24 and introduces the outside air into the wind collecting duct 20, whereby the volume and speed of the introduced wind are significantly increased.

Therefore, the wind with the increased volume and accelerated speed is strongly introduced into the blades 32 of the turbine module 30. Accordingly, a rotational torque and a rotational speed of the power generation rotation shaft 31 provided with the blades 32 are increased, and a rotational force and a centrifugal force of the blades 32 also increase. Thus, the power generation output is significantly enhanced.

Figure 18:
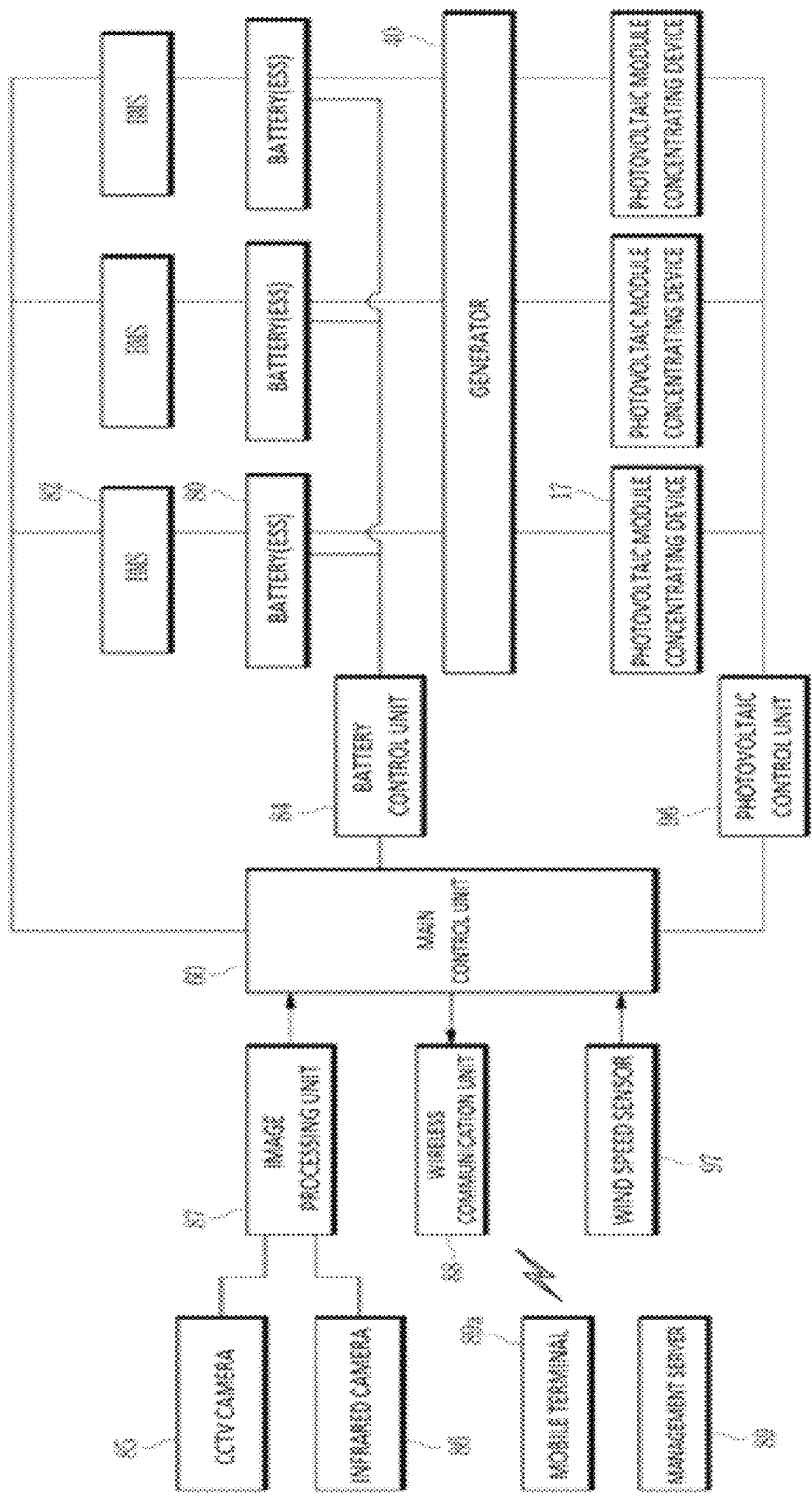
FIG. 18 is a block diagram schematically illustrating internal configurations of a hybrid power generation system according to an embodiment of the present invention.

In addition, a main control unit 60 in FIG. 18 may control the wind inducing rotation motor 24 by applying a driving signal to the wind inducing rotation motor 24 and comparing an average operating rotation speed of each power generation rotation shaft 31 with a reference rotation speed. Specifically, when the average operating rotation speed is less than the reference rotation speed, the main control unit 60 allows wind inducing rotation motor 24 to be operated, and when the average operating rotation speed exceeds the reference rotation speed, the main control unit 60 controls the operation of the wind inducing rotation motor 24 to stop.

In this case, the wind inducing rotation motor 24 may be operated with power generated by the photovoltaic module concentration device 17.

That is, when the power generation rotation shaft 31 rotates and exceeds the reference rotation speed, the wind inducing rotation motor 24 stops operating, thereby extending the lifetime of the device and preventing power waste.

FIGS. 7 and 8, the present invention may further include a windshield plate 23 having a shape surrounding the wind inducing rotation blade 22 between the wind inducing rotation shaft 21 and the inner surface of the inlet 20*a* of the wind collecting duct 20, or between the inner surface of the wind inducing rotation shaft 21 and the inner surface of the outlet 20*b* of the wind collecting duct 20.

That is, with respect to the center of the wind inducing rotation shaft 21, the upper portion of the wind inducing rotation blade 22 is surrounded by the windshield plate 23, and the windshield plate 23 blocks the wind introduced from the front of the inner side of the inlet 20*a* of the wind collecting duct 20 or from the front of the inner side of the outlet 20*b*, thereby preventing rotational resistance of the wind inducing rotating blade 22. In addition, the lower portion of the wind inducing rotation blade 22 is not surrounded by the windshield plate 23 and opened, and the introduced wind pushes the wind inducing rotation blade 22 in a direction in which the wind inducing rotation blade 22 rotates, thereby improving collecting efficiency of the wind inducing rotation blade 22.

Furthermore, the wind inducing rotation blade 22 may be plural. Specifically, the plurality of the wind inducing rotation blades 22 may be installed on the whole or a portion of the edge of the inner side of the inlet 20*a* or the edge of the inner side of the outlet 20*b*. In this case, each wind inducing rotation motor 24 may be respectively installed for each wind inducing rotation blade 22, or installed for multiple wind inducing rotation blades 22 to provide a rotational force.

Meanwhile, referring to FIGS. 1, 10, and 11, the power generation rotation shaft 31 of the turbine module 30 is provided perpendicular to a direction in which the wind is discharged from the wind collecting duct 20, and a plurality of the blades 32 of the turbine module 30 may be provided radially with respect to the power generation rotation shaft 31.

In this case, the turbine module 30 may be fixedly installed on a frame 70, which is horizontally provided at the middle of the base frame 10.

That is, the power generation rotation shaft 31 is provided vertically, and the blade 32 is horizontally coupled to the power generation rotation shaft 31 through a connecting rod 33 and rotates. Accordingly, the present invention has low noise, does not adversely affect the surrounding environment with noise, and is easy to install and maintain.

In particular, as shown in FIG. 11, the end of the blade 32 is opened to provide a blade wind collecting room 32*a* having a hollow inside. The open end of the blade wind collecting room 32*a* of the blade 32 may be disposed to face the outlet 20*b* of the wind collecting duct 20.

Preferably, the turbine module 30 may be disposed on both left and right side of the rear of the outlet 20*b* of the wind collecting duct 20. The turbine modules 30 may be arranged in two rows of the front row and the rear row as shown in FIG. 3, or in single row at the front row as shown in FIG. 5.

In addition, the blade 32 may be disposed within a vertical length range of the outlet 20*b* of the wind collecting duct 20.

That is, since the wind discharged from the wind collecting duct 20 is collected inside the blade wind collecting room 32*a* of the blade 32, which is empty, the wind receiving area and resistance of the blade 32 increase, and thus a rotational force and a centrifugal force of the power generation rotation shaft 31 increase during the rotation. Accordingly, efficiency of the power generation energy is greatly improved.

In addition, as shown in FIG. 10, the blade 32 may have a structure in which a circumferential length of the outer surface is longer than that of the inner surface with respect to the power generation rotation shaft 31.

Preferably, the outer surface of the blade 32 may be formed in a streamlined curved shape, and the inner surface of the blade 32 may be formed in a straight-line shape.

That is, since the circumferential length of the outer surface of the blade 32 is formed longer than the circumferential length of the inner surface of the blade 32, when the blade 32 rotates, the speed and pressure difference occur between the outer surface and the inner surface, thereby further increasing a centrifugal force and a rotational force of the blade 32.

As shown in FIG. 11, the blades 32 are symmetrically coupled to the power generation rotation shaft 31 through the connecting rod 33, and the connecting rod 33 may be bolted to the blade 32. That is, a bolt shape formed at the end of the connecting rod 33 is fastened to a bolting hole 33*a* formed in the blade 32, so that the blade 32 is easily coupled to the power generation rotation shaft 31.

In addition, as shown in FIGS. 14*a* to 14*j*, the turbine module 30 may be configured to include the blades 32 having different or the same shape, and the number of blades 32 is appropriately selected according to the power generation capacity of the power generation device. The plurality of blades 32 can be installed symmetrically around the power generation rotation shaft 31.

In addition, a vibration absorbing rotation cap 34 may be coupled to the top end of the power generation rotation shaft 31 as shown in FIGS. 2*a* to 2*c*.

That is, since the vibration absorbing rotation cap 34 having a disk shape is coupled to the top end of the power generation rotation shaft 31, the vibration and noise generated by the powerful rotational force and centrifugal force of the blades 32 can be minimized. Accordingly, the vibration absorbing rotation cap 34 can also prevent breakdown of the turbine module 30 and prolong the lifetime of the power generation device.

Meanwhile, referring to FIGS. 4 and 6, the present invention may further include a wind recollecting means at the rear of the wind collecting duct 20. The wind recollecting means recollects the wind, which passes through the wind collecting duct and escapes from the rear of the turbine module 30, and resupplies the recollected wind to the front portion of the turbine module 30.

That is, since the wind recollecting means recollects wind energy flowing backward, which was previously supplied to the blade wind collecting room 32*a*, and resupplies the recollected wind to the turbine module 30, the wind energy can be efficiently used.

Specifically, the wind recollecting means may be configured to include a wind recollecting member 50. One end of the wind recollecting member 50 is disposed at the rear of the rearmost turbine module 30, and the end of the one end of the wind recollecting member 50 is bent toward the wind collecting duct 20 to recollect the wind passing through the turbine module 30. The other end of the wind recollecting member 50 is disposed at the front of the turbine module 30, and is formed to have a curved shape from the one end to the other end, covering the outer surface of one side of the turbine module 30 to guide the wind recollected from one end toward the other end.

In this case, the other end of the wind recollecting member 50 may be a wind recollecting discharge unit 52a for resupplying the recollected wind to the turbine module 30. As shown in FIG. 4, when the turbine modules 30 are disposed in two rows of the front row and the rear row, the wind recollecting discharge unit 52a of the wind recollecting member 50 may be disposed at the front end of each turbine modules 30 disposed in the front and rear row, respectively. In addition, as shown in FIG. 6, when the turbine modules 30 are disposed in single row, the wind recollecting discharge unit 52a of the wind recollecting member 50 may be disposed at the front end of the turbine modules 30 in the first row.

That is, the remaining wind, which is left after the introduced wind is supplied to the turbine module 30, is recollected at the rear end of the wind recollecting member 50. The recollected wind is guided along the inner surface of the wind recollecting member 50 toward the front end of the wind recollecting member 50, and resupplied to the turbine module 30. Accordingly, the use of wind energy can be maximized.

In addition, a windshield fence 51 may be provided to surround a part of the turbine module 30 on one side of the turbine module 30 facing toward the wind recollecting member 50. The windshield fence 51 may prevent the wind resupplied to the front end of the turbine module 30 through the wind recollecting member 50 from affecting the turbine module 30.

That is, by providing the windshield fence 51, which is in a shape surrounding a part of the turbine module 30 on one side of the path through which the wind recollected from the wind recollecting member 50 is resupplied to the turbine module 30, the blade 32 rotated by the wind discharged from the outlet 20b of the wind collecting duct 20, does not receive the wind with the reverse rotation. Accordingly, the rotational force of the blade 32 is prevented from diminishing, and thus, the rotational force of the turbine module 30 can increase and breakdown can be prevented.

In addition, in the present invention, a wind path forming member 52 for guiding the wind recollected from one end of the wind recollecting member 50 toward the other end may be further provided inside the wind recollecting member 50. In this case, a wind recollecting discharge unit 52a of the wind path forming member 52 is formed at the other end of the wind recollecting member 50.

In this case, the path formed by the wind path forming member 52 is formed to have a gradually narrower cross-sectional area as the path goes from the entrance to the exit of the path, thereby increasing the wind speed of the wind resupplied from the wind recollecting means.

As shown in FIG. 4, when the wind path forming member 52 is disposed in two rows of the front and rear end of the turbine module 30, the wind path forming member 52 disposed at the rear end can form a path together with the windshield fence 51.

Meanwhile, referring to FIG. 10, the hybrid power generation system according to the embodiment of the present invention may further comprise an airflow volume control guide rail 53 having a shape surrounding the circumference of the turbine module 30 around the power generation rotation shaft 31 on the bottom of the frame 70.

In this case, the present invention may be configured to include an airflow volume control rotating door 54 for controlling the airflow volume provided to the turbine module 30 from the wind collecting duct 20. The airflow volume control rotating door 54 is provided with wheels on the bottom end to be movable in the circumferential direction along the airflow volume control guide rail 53, and has a shape of a door surrounding a part of the front end of the turbine module 30.

In addition, the present invention may be configured to include: an airflow volume control rotating door control motor (not shown) that provides a rotational force for rotating the airflow volume control rotating door 54 to the left and right, and a wind speed sensor 97, shown in FIG. 18, that is installed at the inlet 20a and/or the outlet 20b of the wind collecting duct 20 to measure the wind speed value of wind passing through the wind collecting duct 20. In this case, the main control unit 60, shown in FIG. 18, can apply a driving signal to the airflow volume control rotating door control motor, and may adjust the movement of the airflow volume control rotating door 54 according to an input value input from the wind speed sensor 97.

In this case, the wind speed sensor 97 may be installed on the front portion of the top end of the wind collecting duct 20, the inlet 20a, or the outlet 20b. Furthermore, the power generation device may further include various sensors such as a rain gauge or a barometer in addition to the wind speed sensor 97. The main control unit 60 controls the power generation device by comparing the input values input by the sensors with reference values.

That is, since the airflow volume control rotating door 54 is automatically rotated and moved by the control of the main control unit 60 along the airflow volume control guide rail 53 according to the input value corresponding to the wind discharged by the wind collecting duct 20, the wind volume discharged from the outlet 20b and supplied to the blade 32 can be controlled. Accordingly, by automatically adjusting the airflow volume control rotating door 54, it is possible to prevent excessive strong wind that adversely affects the power generation device from introducing into the wind collecting duct 20 and to prevent malfunction of the turbine module 30.

For example, when a weak typhoon blows and the wind speed becomes 20 m/s or more, the wind volume control rotating door 54 installed on the left rotates counterclockwise to the end of the left airflow volume control guide rail 53 and moves to the right. The airflow volume control rotating door 54 installed on the right rotates clockwise to the end of the right airflow volume control guide rail 53 and moves to the left.

In this case, although not shown in the drawings, the present invention may further include a wind recollecting prevention door provided in the wind recollecting member, and a wind recollecting prevention door guide rail. In this case, when the wind speed of the typhoon is 20 m/s or more, the wind recollecting prevention door moves along wind recollecting prevention door guide rail and closes, and the recollected wind does not enter into the inside of the wind recollecting member and directly goes out to the outside.

Accordingly, the wind discharged from the outlet 20b does not flow into the blade wind collecting room 32a of the blade 32, and as a result, the turbine module 30 stops rotating.

Meanwhile, referring to FIGS. 1 to 3, a multiplying gearbox 35 is connected between the power generation rotation shaft 31 and the generator 40 to increase speed of rotation provided to the generator 40 from the power generation rotation shaft 31.

That is, the multiplying gearbox 35 with a gear ratio formed by several large and small gears increases the number of rotations of the power generation rotation shaft 31 to increase electric energy.

In addition, the present invention may be configured to include: a braking device 36 installed to brake the power generation rotation shaft 31, and a separate control unit for inputting a braking signal to the braking device 36. The braking signal is input to the braking device 36 when the rotational speed of the power generation rotation shaft 31 exceeds a braking reference rotational speed.

That is, the braking device 36 may stop the power generation rotation shaft 31 to prevent damage to the power generation device or an accident in case that the rotational force by the power generation rotation shaft 31 is too strong.

In FIGS. 2A and 2B, the multiplying gearbox 35 is connected to the power generation rotation shaft 31. On the other hand, in FIG. 2c, the power generation rotation shaft 31 is integrally coupled to a shaft 38 of a rotating member 37 coupled to the top portion of the generator 40. That is, when the generator 40 is configured as a gearless type, the multiplying gearbox 35 is not applied.

In addition, referring to FIGS. 3 and 5, the photovoltaic module concentration device 17 is installed on the top end of the post 13. The photovoltaic module concentration device 17 may provide power to the wind inducing rotation motor 24 installed at the inlet 20a and the outlet 20b of the wind collecting duct 20. In this case, the photovoltaic module concentration device 17 may be a solar cell concentration panel.

Specifically, when the wind does not blow, electricity can be generated using solar energy, and the wind inducing means installed in the wind collecting duct 20 is forcibly operated with this power. Accordingly, the blade 32 is rotated more quickly to operate the power generation device, and it is possible to produce electricity using the wind energy and the solar energy at the same time.

In the present invention, a lightning arrester 18 may be installed at the uppermost end of the power generation device. The lightning arrester 18 provided higher than the photovoltaic module concentration device 17 can protect the power generation system by guiding the lightning to the ground. That is, the present invention can solve a problem of the conventional horizontal shaft generator in which a blade induces the lightning.

In addition, each of the motors of the present invention may be operated by electricity generated by the photovoltaic module concentration device 17 and the generator 40.

Figure 17A:
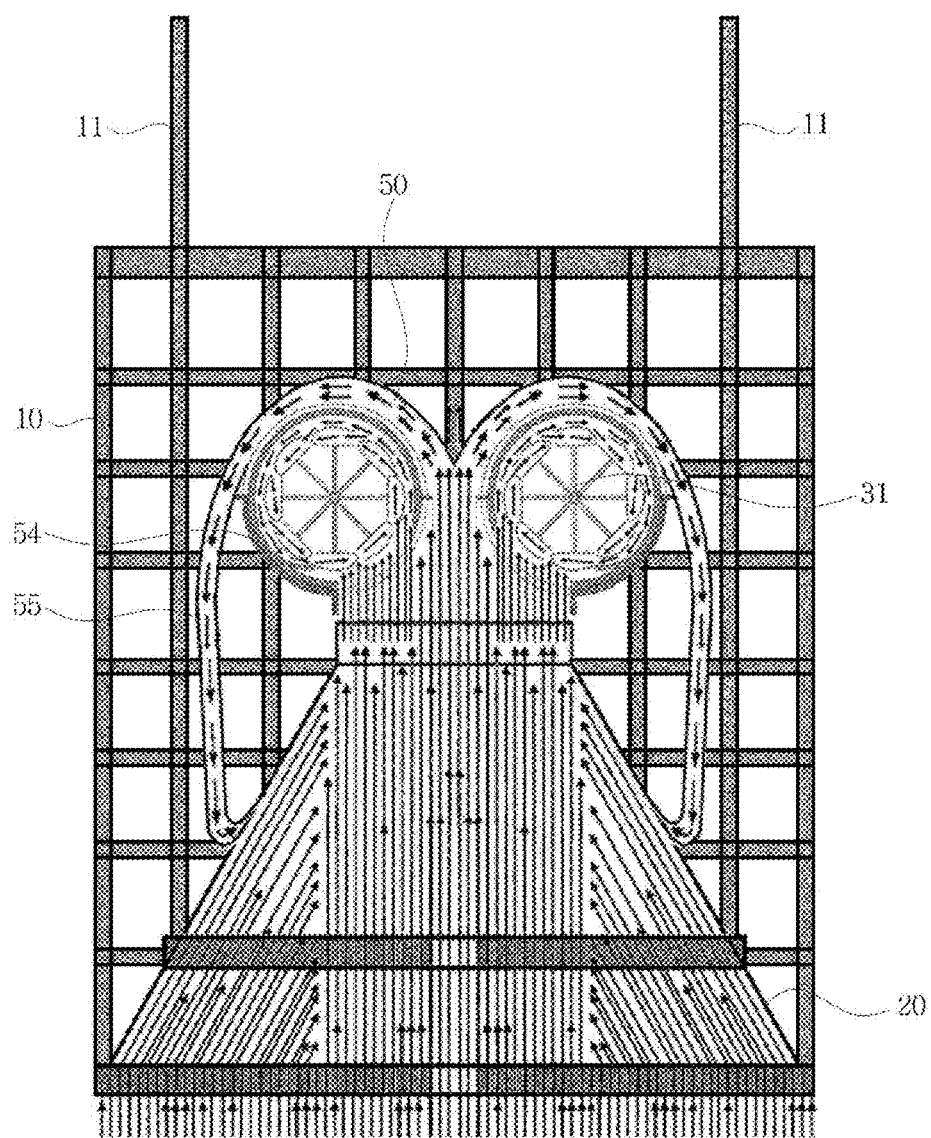
FIGS. 17A and 17B are drawings illustrating a structure in which a wind recollecting pipe is extended from a wind recollecting member and coupled to both sides of a wind collecting duct according to an embodiment of the present invention. The embodiment of FIGS. 17A and 17B is different from that of FIG. 6
Figure 17B:
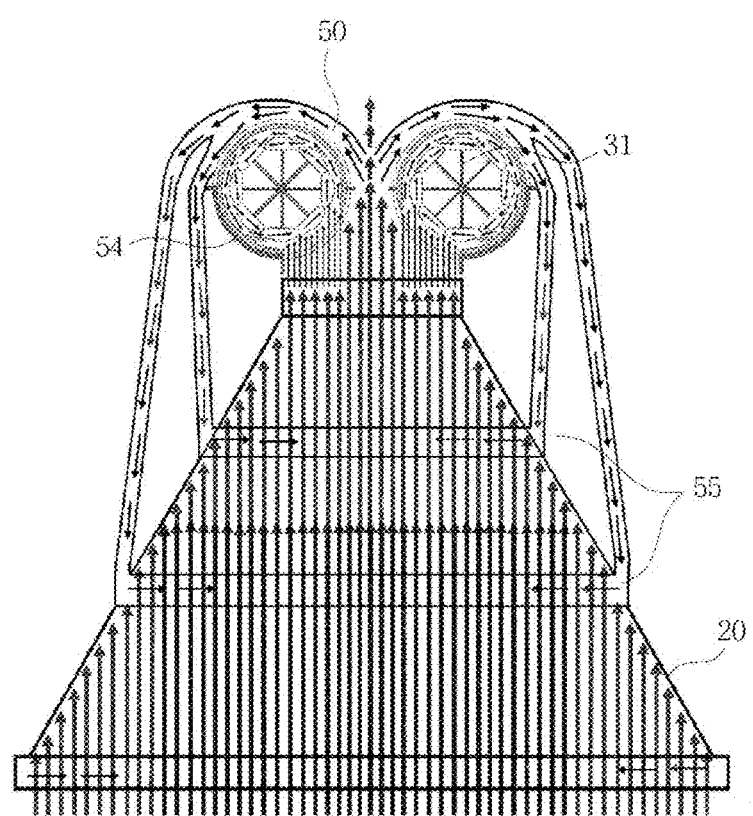

FIGS. 17A and 17B, the present invention further includes a wind recollecting pipe 55 extended from the wind recollecting member 50 and coupled to both top end portions or middle end portions of the wind collecting duct 20. By recollecting the wind introduced from the wind collecting duct 20 and redirecting the introduced wind back to the front end portion or the middle end portion of the wind collecting duct 20 to increase the wind speed, the power generation efficiency can be improved. The wind recollecting pipe 55 communicates with the wind recollecting member 50 and the top end portion or middle end portion of the wind collecting duct 20.

Figure 19:
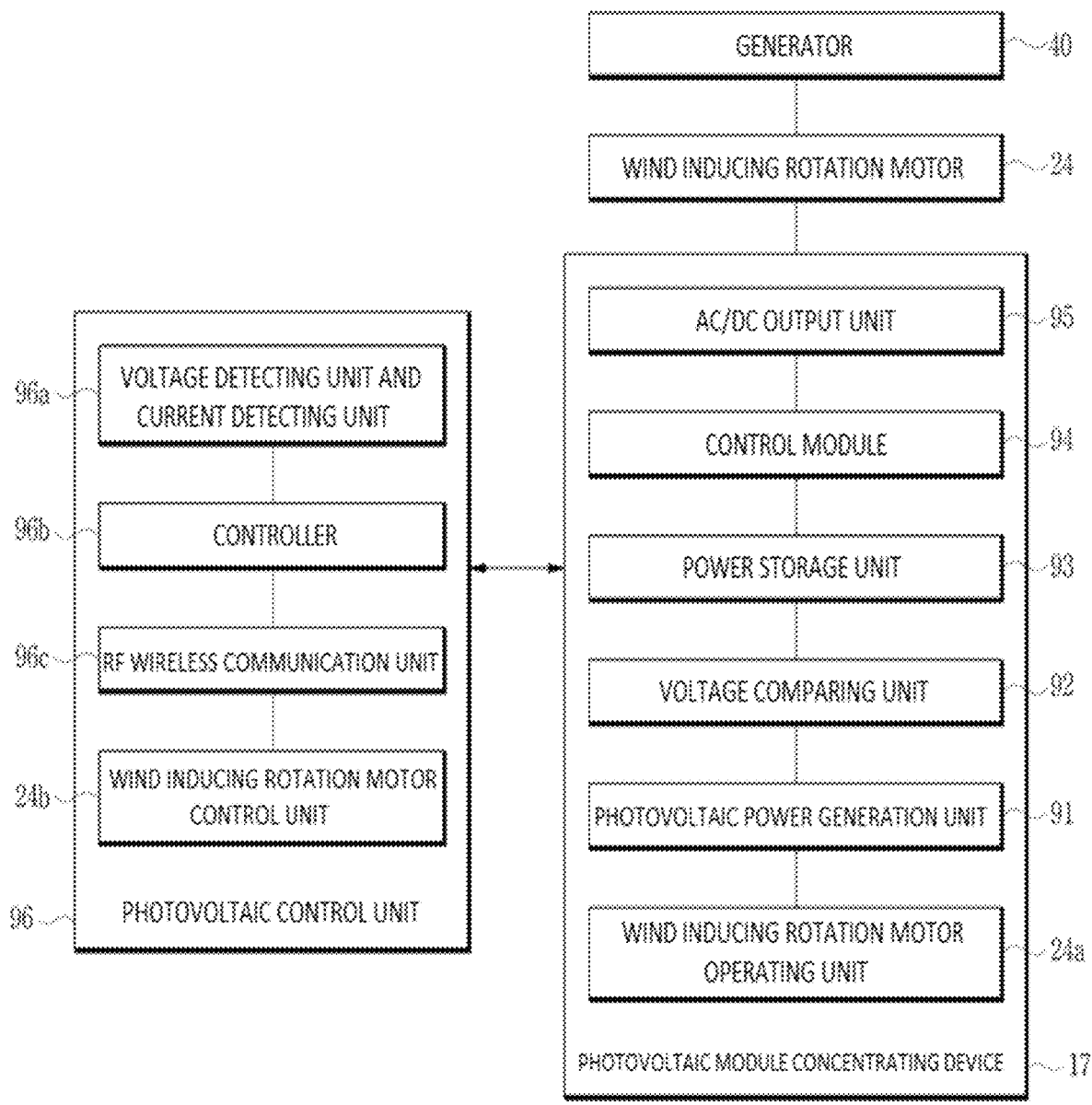
FIG. 19 is a block diagram schematically illustrating internal configurations of a photovoltaic module concentration device, a wind inducing rotating motor, a generator, and a photovoltaic control unit connected thereto according to an embodiment of the present invention.
Figure 20:
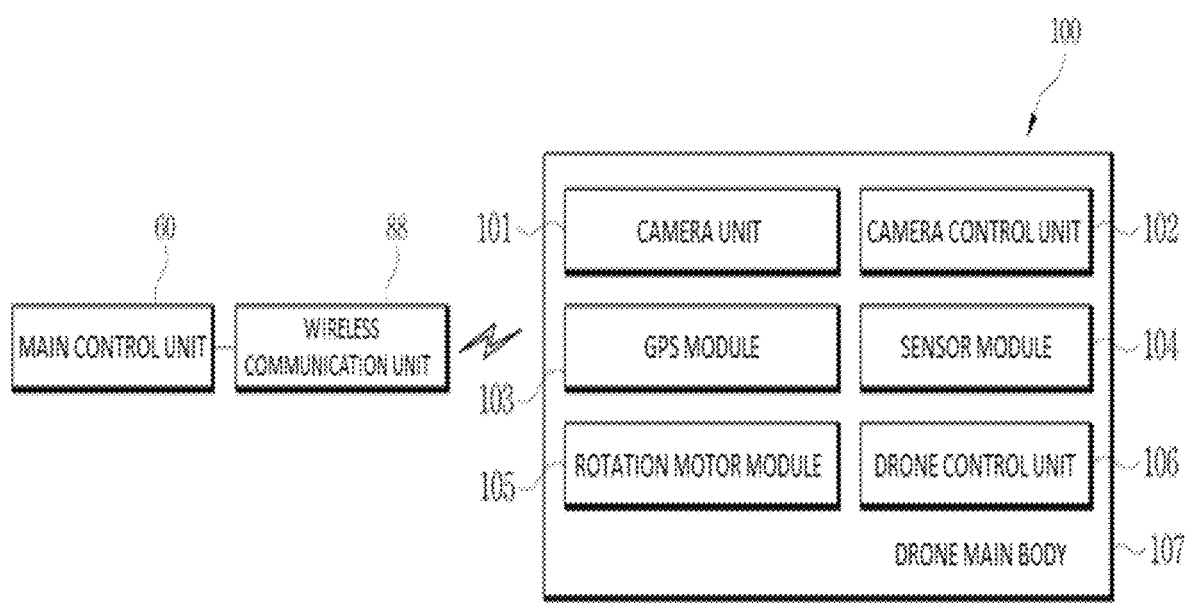
FIG. 20 is a diagram illustrating a connection between a hybrid power generation system and a drone device according to an embodiment of the present invention.

FIG. 18 is a block diagram schematically illustrating internal configurations of a hybrid power generation device according to an embodiment of the present invention. FIG. 19 is a block diagram schematically illustrating internal configurations of a photovoltaic module concentration device, a wind inducing rotating motor, a generator, and a photovoltaic control unit connected thereto according to an embodiment of the present invention. FIG. 20 is a diagram illustrating a connection between a hybrid power generation system and a drone device according to an embodiment of the present invention.

FIGS. 18 to 20, the hybrid power generation system according to an embodiment of the present invention may further includes: a battery 80, a BMS 82, a battery control unit 84, a CCTV camera 85, an infrared camera 86, and an image processing unit 87, the wind speed sensor 97, the generator 40, the photovoltaic module concentration device 17, and the main control unit 60. A drone device 100 may be further included in the hybrid power generation system.

The CCTV camera 85 and the infrared camera 86 selectively operates during the day and at night to capture images of the surroundings of the generator 40 and generates image information for fire monitoring and moving or fixed objects.

The image processing unit 87 may process and store the image information generated from the CCTV camera 85 and the infrared camera 86, and transmit the monitored image information to an external management server 89 or a mobile terminal 89a through a wireless communication unit 88 according to a control signal of the main control unit 60.

When the main control unit 60 receives one or more signal of a fire signal, temperature information above a reference temperature value, heat information, smoke information, and a flame signal, from a detection sensor unit (not shown) installed on one side of the power generation device, a camera driving signal may be transmitted to the CCTV camera 85 and the infrared camera 86, and generated image information may be transmitted to the external management server 89 or the mobile terminal 89a through the wireless communication unit 88. In this case, the detection sensor unit includes a fire detection sensor, a flame detection sensor, a heat detection sensor, a smoke detection sensor, and a temperature sensor.

The wind speed sensor 97 is installed on the wind collecting duct 20 to measure a wind speed value, which is a strength of wind, and transmits the measured wind speed value to the main control unit 60.

The generator 40 is electrically connected to each of a plurality of batteries ESS 80, which charges and discharges electric energy according to the rotation of the turbine module 30 by wind power.

The generator 40 is electrically connected to each of the plurality of photovoltaic module concentration devices 17 so that the plurality of photovoltaic module concentration devices 17 supply electric energy to each motor.

The battery 80 is a system for storing electric energy generated by the generator 40, and charging and discharging electric energy. Each battery 80 is electrically connected to each BMS 82.

The generator 40 is electrically connected to each of the plurality of photovoltaic module concentration devices 17 so that the plurality of photovoltaic module concentration devices 17 supply electric energy to each motor.

The BMS 82 is a battery management system that detects voltage, current, temperature, heat, smoke, and other factors of the battery 80 to protect the battery 80. The BMS 82 controls the charge and discharge amount of the battery 80 to an appropriate level, performs cell balancing of the battery 80, and identifies and controls the remaining capacity of the battery 80.

In addition, the BMS 82 protects the battery 80 and the hybrid power generation system through emergency operation of a fire extinguishing device (not shown) when a fire is detected. According to a method for managing the battery 80 of the present invention, energy generated during discharging the battery 80 is recharged in an energy storage device such as a secondary battery, and thus, the total energy can be managed by using the recharged energy in the power generation system.

The photovoltaic module concentration device 17 includes: a photovoltaic power generation unit 91 equipped with a solar cell generating electric energy by receiving sunlight; a voltage comparing unit 92 connected to an output terminal of the photovoltaic power generation unit 91 to detect an output voltage and compare the output voltage with a reference voltage and including a constant voltage circuit, a voltage boost circuit, and a constant current circuit; a power storage unit 93 storing the electric energy; a control module 94 controlling to output the electric energy to a AC/DC output unit 95, and a wind inducing rotation motor operation unit 24a for operating the wind inducing rotation motor 24 in FIG. 7.

The photovoltaic power generation unit 91 may be a solar cell array. The solar cell array is formed by combining a plurality of solar cell modules. A solar cell module is a device that converts solar energy into electric energy and generates a predetermined voltage and current by connecting a plurality of solar cells in series or in parallel. Accordingly, the solar cell array absorbs solar energy and converts the solar energy into electric energy.

Each photovoltaic module concentration device 17 is electrically connected a photovoltaic control unit 96.

The photovoltaic control unit 96 may be configured to include: a voltage detecting unit and a current detecting unit 96a connected to a panel output line of the photovoltaic power generation unit 91 to respectively detect a voltage and a current of electric energy output from the photovoltaic panel; a controller 96b calculating the levels of the current and voltage detected by the voltage detecting unit and current detecting unit 96a and controlling a RF wireless communication unit 96c to transmit data including the levels of the detected current and voltage; the RF wireless communication unit 96c wirelessly transmitting the data generated by the controller 96b, and a wind inducing rotation motor control unit 24b for controlling the wind inducing rotation motor operation unit 24a.

The main control unit 60 compares the calculated levels of current and voltage with those of preset reference voltage and current. When the calculated levels of current and voltage exceeds the preset reference voltage and current, the main control unit 60 may generate and transmit a warning signal to the external management server 89 or the mobile terminal 89a through the wireless communication unit 88.

Each battery 80 is electrically connected to the battery control unit 84 that monitors the voltage of each battery cell in real time.

The battery control unit 84 measures the voltage of each battery cell, sets one of the measured voltages as a balancing reference voltage, and performs balancing through charging and discharging based on the balancing reference voltage.

The battery control unit 84 connects a current sensing resistor to the battery cell in series to measure the potential difference between both ends of the cell, and uses the measured potential difference to identify the current direction in the battery cell to determine the state of charge.

The battery control unit 84 measures voltages of the battery cells and calculates a voltage deviation between the plurality of the battery cells. When the calculated voltage deviation of the battery cells is greater than or equal to a predetermined reference value, the battery control unit 84 controls the system by determining that cell balancing is necessary and communicating with the photovoltaic module concentration device 17 to allow the battery cells to selectively receive a voltage from the photovoltaic module concentration device 17 to perform cell balancing.

The battery control unit 84 periodically receives information of the remaining capacity of the battery cell and transmits the information of the remaining capacity to the main control unit 60.

The main control unit 60 analyzes the remaining capacity of the cells received from each battery 80. When the main control unit 60 determines that the remaining capacity of the cell is less than or equal to a preset reference capacity value, the main control unit 60 controls the system by generating and transmitting an energy supplying signal to the photovoltaic module concentration device 17, while the battery having the reference capacity value or less performs a charging process, and allowing the electric energy obtained from the photovoltaic module concentration device 17 to be provided to the wind inducing rotation motor 24 or the generator 40.

When the wind speed value received from the wind speed sensor 97 is less than the preset reference wind speed value to the extent that the generator 40 cannot produce electric energy, the main control unit 60 controls the system by generating and transmitting an energy supplying signal, and allowing the electric energy obtained from the photovoltaic module concentration device 17 to be provided to the wind inducing rotation motor 24 or the generator 40.

That is, the hybrid power generation system of the present invention can generate electric energy by driving the wind inducing rotation motor 24, forming wind, and operating the turbine module 30 even when natural wind is not blowing enough.

When the main control unit 60 receives a drone driving signal from the external management server 89 or the mobile terminal 89a, the main control unit 60 transmits the drone driving signal to a drone control unit 106 of a drone main body 107 through the wireless communication unit 88.

Meanwhile, the drone device 100 of the embodiment of the present invention has a drone main body 107 having a certain shape, and transmits and receives data and control signals to and from the main control unit 60 of the hybrid power generation system.

The drone main body 107 is formed in a certain shape, such as a square box, to protect the devices inside from external pressure or shock.

The drone main body 107 includes an operation management system that monitors fire and the hybrid power generation system by capturing images of a specific object, for example, surrounding environment of the generator 40 in real time, by one or more cameras 101 mounted on the top, the center, or the bottom of the center portion, or the left and right of the side portion of the drone main body 107. In this case, the cameras 101 may be configured using technologies based on Internet of Things (IoT), the Artificial Intelligence (AI), and the like. Accordingly, the potential danger in the hybrid power generation system can be detected in advance, thereby reducing the risk of breakdown of the system.

A camera control unit 102 controls a camera unit 101 to rotate up, down, left, right, and 360 degrees, and controls a camera zoom actuator (not shown) to operate and zoom in or out.

A GPS module 103 is positioned on one side of the front end of the drone main body 107, and generates a current position coordinate of the drone main body 107, by performing data processing of coordinate information received from the drone main body 107 before and after takeoff and after landing of the drone main body 107 in real time.

A sensor module 104 is positioned on top end of the drone main body 107 of the drone, and detects detailed information necessary for flying the drone.

A rotation motor module 105 is positioned inside the drone main body 107 to rotate rotating blades at the same rotation speed and the same torque at high speed.

The drone control unit 106 controls overall operations of the drone main body 107. Specifically, the drone control unit 106 receives a flight control command signal of the drone device 100 from a IoT type drone control application module; controls the drone main body 107 to land, take off, fly, and performing hovering flight by moving a rotation axis of the rotation motor module 105 and adjusting the position and the speed, and transmits captured image data and flight response signal to the IoT type drone control application module.

When the main control unit 60 receives at least one of a fire signal, temperature information above a preset temperature value, heat information, smoke information, and a flame signal from the detection sensor unit (not shown) installed on one side of the power generation system, the main control unit 60 generates and transmits a flight control command signal to the drone control unit 106.

The drone control unit 106 may transmit a driving signal to the GPS module 103, the sensor module 104, the rotation motor module 105, and the camera control unit 102 to acquire various image information of a place where danger is detected and also transmit the acquired image information to the external management server 89 or the mobile terminal 89a through the wireless communication unit 88.

The present invention has been described in detail through embodiments above. However, this is for describing the present invention in detail, and the hybrid power generation system according to the present invention is not limited to the embodiments described above. Terms such as "include," "comprise," or "have" described above do not exclude other components unless otherwise stated, but should be construed as being able to further include other components. All terms, including technical and scientific terms, have the same meaning as commonly understood by one of ordinary skill in the art to which the present invention belongs, unless otherwise defined.

In addition, the above description is merely illustrative of the technical idea of the present invention, and various modifications and variations are possible for one of ordinary skill in the art without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of the present invention should be construed by the appended claims, and all technical ideas within the scope equivalent to the claims should be construed as being included in the scope of the present invention.

What is claimed is:

1. A hybrid power generation system comprises:
   a base frame configured to be rotatable by a rotating means on a main rotation shaft;
   a wind collecting duct provided on one end of the base frame to introduce wind inside, increasing a speed of the introduced wind, and discharging the introduced wind with increased speed;
   a turbine module provided on a rear of the wind collecting duct from which the wind is discharged and including a power generation rotation shaft and a blade installed on the power generation rotation shaft, wherein the blade to which the wind discharged from the wind collecting duct is provided, rotates the power generation rotation shaft;
   a generator connected to the power generation rotation shaft and generating electric energy by a rotational force of the power generation rotation shaft;
   a battery electrically connected to the generator to charge and discharge the electric energy generated by rotation of the turbine module;
   a photovoltaic module concentration device generating electric energy from one or more solar cell and electrically connected to a plurality of wind inducing rotation motors installed at an inlet and an outlet of the wind collecting duct to supply the electric energy to the plurality of wind inducing rotation motors;
   a wind speed sensor installed on the wind collecting duct to measure a wind speed value, which is a strength of wind;
   a main control unit controlling the system by generating and transmitting an energy supplying signal and allowing the electric energy obtained from the photovoltaic module concentration device to be provided to each of the plurality of wind inducing rotation motors, when the wind speed value received from the wind speed sensor is less than a preset reference wind speed value to the extent that the generator cannot produce electric energy, and
   a wind recollecting means disposed at a rear of the turbine module, recollecting wind escaping from the rear of the turbine module among wind discharged from the wind collecting duct, and resupplying the recollected wind to a front portion of the turbine module or a middle portion of the wind collecting duct,
   wherein the hybrid power generation system further comprises a plurality of wind inducing rotation blades installed on each of a plurality of wind inducing rotation shafts, the plurality of wind inducing rotation shafts being installed along an edge of an inner surface of the inlet of the wind collecting duct or along an edge of an inner surface of the outlet of the wind collecting duct,
   wherein each of the plurality of wind inducing rotation motors is adapted to provide rotational force to each of the plurality of wind inducing rotation shafts,
   wherein the wind recollecting means includes:
   a wind recollecting member formed to recollect wind passing through the turbine module, wherein one end of the wind recollecting member is disposed at a rear of the turbine module and an end of the one end of the wind recollecting member is bent toward the wind collecting duct, wherein the wind recollecting member is formed to have a curved shape from the one end to the other end, covering an outer surface of one side of the turbine module to guide wind recollected from the one end of the wind recollecting member toward the other end thereof, and
   a wind recollecting pipe extended from the wind recollecting member, an end of the wind recollecting pipe being directly and physically connected to middle end portions of the wind collecting duct,
   wherein the wind recollecting pipe communicates with the wind recollecting member and the middle end portions of the wind collecting duct and increases a speed of wind by recollecting wind from the wind collecting duct and redirecting the recollected wind back to the middle end portions of the wind collecting duct, wherein the photovoltaic module concentration device is electrically connected to a photovoltaic control unit, wherein the photovoltaic control unit includes:

a voltage detecting unit and a current detecting unit connected to an output line of a photovoltaic panel to respectively detect a voltage and a current of electric energy output from the photovoltaic panel;

a controller calculating levels of the current and voltage detected by the voltage detecting unit and current detecting unit and controlling a RF wireless communication unit to transmit data including the levels of the detected current and voltage, the RF wireless communication unit wirelessly transmitting the data generated by the controller, wherein the main control unit compares the calculated levels of the current and voltage with those of preset reference voltage and current, and when the calculated levels of the current and voltage exceed those of the preset reference voltage and current, the main control unit generates and transmits a warning signal to an external management server or a mobile terminal through the wireless communication unit, wherein each battery is electrically connected to a battery control unit that monitors a voltage of each battery cell in real time, wherein the battery control unit periodically receives information of a remaining capacity of the battery cell and transmits the information of the remaining capacity to the main control unit, wherein the main control unit analyzes the remaining capacity of the battery cell received from each battery, and when the main control unit determines that the remaining capacity of the battery cell is less than or equal to a preset reference capacity value, the main control unit controls the system by generating and transmitting an energy supplying signal to the photovoltaic module concentration device, while the battery cell having the preset reference capacity value or less performs a charging process, and allowing the electric energy obtained from the photovoltaic module concentration device to be provided to the plurality of wind inducing rotation motors or the generator.

2. The hybrid power generation system of claim 1, wherein each battery measures a potential difference between both ends of the battery cell by connecting a current sensing resistor to the battery cell in series, and determine a state of charge of the battery cell by identifying a current direction of the battery cell using the measured potential difference, wherein the battery control unit measures voltages of the battery cells and calculates a voltage deviation between the battery cells, and when the main control unit determines that the calculated voltage deviation of the battery cells is greater than or equal to a preset reference value, the battery control unit determines that cell balancing is necessary and controls the system by communicating with the photovoltaic module concentration device to allow the battery cells to be selectively supplied with a voltage from the photovoltaic module concentration device to perform cell balancing.

3. The hybrid power generation system of claim 1, further comprising a camera unit capturing an image of surroundings of the generator to obtain image information, wherein the camera unit is mounted on a drone to capture the image of the surroundings of the generator and monitors fire and the hybrid power generation system in real time using Internet of Things (IoT) technology, wherein when the main control unit receives at least one of a fire signal, temperature information above a preset temperature value, heat information, smoke information, and a flame signal from a detection sensor, the main control unit transmits a camera driving signal to the camera unit, and transmits the obtained image information to an external management server or a mobile terminal through a wireless communication unit.

* * * * *